United States Patent
Koç et al.

(10) Patent No.: US 7,401,109 B2
(45) Date of Patent: Jul. 15, 2008

(54) MULTIPLICATION OF MULTI-PRECISION NUMBERS HAVING A SIZE OF A POWER OF TWO

(75) Inventors: Çetin K. Koç, Corvallis, OR (US); Serdar S. Erdem, Istanbul (TR)

(73) Assignee: The State of Oregon Acting by and Through the State Board of Higher Education on Behalf of Oregon State University, Corvallis, OR (US)

( * ) Notice: Subject to any disclaimer, the term of this patent is extended or adjusted under 35 U.S.C. 154(b) by 657 days.

(21) Appl. No.: 10/636,321

(22) Filed: Aug. 6, 2003

(65) Prior Publication Data

US 2004/0098440 A1      May 20, 2004

Related U.S. Application Data

(60) Provisional application No. 60/419,204, filed on Oct. 16, 2002, provisional application No. 60/401,589, filed on Aug. 6, 2002.

(51) Int. Cl.
*G06F 7/523* (2006.01)
(52) U.S. Cl. ..................................................... 708/625
(58) Field of Classification Search .................. 708/625
See application file for complete search history.

(56) References Cited

U.S. PATENT DOCUMENTS

| | | | |
|---|---|---|---|
| 4,037,093 A | 7/1977 | Gregg et al. | |
| 4,435,823 A | 3/1984 | Davis et al. | |
| 4,754,421 A * | 6/1988 | Bosshart | 708/625 |
| 4,811,269 A * | 3/1989 | Hirose et al. | 708/627 |
| 5,220,606 A | 6/1993 | Greenberg | |
| 5,457,804 A * | 10/1995 | Ohtomo | 708/627 |
| 5,880,985 A * | 3/1999 | Makineni et al. | 708/625 |
| 6,026,420 A | 2/2000 | DesJardins et al. | |
| 6,199,087 B1 | 3/2001 | Blake et al. | |
| 6,233,597 B1 * | 5/2001 | Tanoue et al. | 708/625 |
| 6,343,305 B1 | 1/2002 | Koc et al. | |
| 6,421,807 B1 | 7/2002 | Nakamura et al. | |
| 6,466,959 B2 | 10/2002 | Blake et al. | |
| 6,766,345 B2 | 7/2004 | Stein et al. | |
| 6,993,136 B2 * | 1/2006 | Solinas | 380/278 |
| 7,003,106 B2 | 2/2006 | Ouyang | |
| 7,031,468 B2 | 4/2006 | Hoffstein et al. | |

(Continued)

OTHER PUBLICATIONS

Cormen et al., *Introduction to Algorithms*, MIT, pp. 59-61 (1990).

(Continued)

*Primary Examiner*—David H Malzahn
(74) *Attorney, Agent, or Firm*—Klarquist Sparkman, LLP

(57) ABSTRACT

Multi-precision multiplication methods include storing a first operand and a second operand as a first array and a second array of n words. A first weighted sum is determined from multiple subproducts of corresponding words of the first operand and the second operand. The methods may further include iteratively determining a next weighted sum from a previous weighted sum and a recursively calculated intermediate product. The disclosed methods can be used in a variety of different applications (e.g., cryptography) and can be implemented in a number of software or hardware environments.

44 Claims, 11 Drawing Sheets

U.S. PATENT DOCUMENTS

| | | | |
|---|---|---|---|
| 7,082,452 | B2 | 7/2006 | Stein et al. |
| 7,111,166 | B2 | 9/2006 | Dror et al. |
| 7,133,889 | B2 | 11/2006 | Parthasarathy et al. |
| 2001/0024502 | A1 | 9/2001 | Ohkuma et al. |
| 2002/0016773 | A1 | 2/2002 | Ohkuma et al. |
| 2002/0039418 | A1 | 4/2002 | Dror et al. |
| 2002/0041681 | A1 | 4/2002 | Hoffstein et al. |
| 2003/0068037 | A1 | 4/2003 | Bertoni et al. |
| 2003/0105791 | A1 | 6/2003 | Stein et al. |
| 2003/0110196 | A1 | 6/2003 | Stein et al. |
| 2003/0128841 | A1 | 7/2003 | Ouyang |
| 2003/0133568 | A1 | 7/2003 | Stein et al. |
| 2003/0135530 | A1 | 7/2003 | Parthasarathy et al. |
| 2003/0140078 | A1 | 7/2003 | Feuser |
| 2003/0206628 | A1 | 11/2003 | Gura et al. |
| 2003/0206629 | A1 | 11/2003 | Eberle et al. |
| 2003/0212729 | A1 | 11/2003 | Eberle et al. |
| 2004/0107341 | A1 | 6/2004 | Hall et al. |
| 2004/0109561 | A1 | 6/2004 | Koc et al. |
| 2006/0269054 | A1 | 11/2006 | Dror et al. |

OTHER PUBLICATIONS

De Win et al., "A fast software implementation for arithmetic operations in GF($2n$)," *Advances in Cryptology—ASIACRYPT 96, Proceedings*, pp. 65-76 (1996).

Diffie et al., "New Directions in Cryptography," *IEEE Trans. Information Theory*, pp. 644-654 (1976).

Erdem et al., "A Less Recursive Variant of Karatsuba-Ofman Algorithm for Multiplying Operands of Size a Power of Two," *16th IEEE Symposium on Computer Arithmetic*, 8 pp (2003).

Erdem, "Improving the Karatsuba-Ofman Multiplication Algorithm for Special Applications," Ph.D. Thesis, Oregon State University (2002).

Geddes et al., *Algorithms for Computer Algebra*, Kluwer Academic Publishers, Boston Chapter 4, pp. 111-145 (1992).

Guajardo et al., "Efficient algorithms for elliptic curve cryptosystems," *Advances in Cryptology—CRYPTO 97, Proceedings*, pp. 342-356 (1997).

IEEE P1363, "Standard specifications for public-key cryptography," Draft Version 13 (Nov. 12, 1999).

Johnson et al., "The Elliptic Curve Digital Signature Algorithm (ECDSA)," Technical Report CORR 99-34, Dept. of C&O, University of Waterloo, Canada, 55 pp. (1999).

Karatsuba et al., "Multiplication of Multidigit Numbers on Automata," *Soviet Physics-Doklady*, vol. 7, pp. 595-596 (1963).

Knuth, *The Art of Computer Programming*, vol. 2, *Seminumerical Algorithms*, Addison-Wesley, Reading, MA, pp. 265-294 (1998).

Koblitz, "Elliptic curve cryptosystems," *Mathematics of Computation*, vol. 48, No. 177, pp. 203-209 (Jan. 1987).

Koç, *High-Speed RSA Implementation: Version 2.0*, RSA Laboratories, 73 pp. (Nov. 1994).

Koç et al., "Montgomery Multiplication in GF($2k$)," *Design, Codes and Cryptography*, vol. 14, pp. 57-69 (1998).

Lidl et al., *Introduction to Finite Fields and Their Applications*, Cambridge University Press, New York, NY, pp. 541-566 (1994).

Menezes, *Elliptic Curve Public Key Cryptosystems*, Kluwer Academic Publishers, Boston, MA, pp. 83-99 (1993).

Menezes et al., *Handbook of Applied Cryptography*, CRC Press, Boca Raton, FL, pp. 591-630 (1997).

Miller, "Uses of Elliptic Curves in Cryptography," *Advances in Cryptology—CRYPTO 85, Proceedings*, pp. 417-426 (1985).

Montgomery, "Modular Multiplication Without Trial Division," *Mathematics of Computation*, vol. 44, pp. 519-521 (1985).

Mullin et al., "Optimal Normal Bases in GF($pn$)," *Discrete Applied Mathematics*, vol. 22, pp. 149-161 (1988).

National Institute for Standards and Technology, Digital Signature Standard (DSS), FIPS PUB 186-2, 76 pp. (Jan. 2000).

Paar et al., "Fast Arithmetic Architectures for Public-Key Algorithms over Galois Fields GF(($2n$)$m$)," *Advances in Cryptology—EUROCRYPT 97, Proceedings*, pp. 363-378 (1997).

Rivest et al., "A Method for Obtaining Digital Signatures and Public-Key Cryptosystems," *Communications of the ACM*, vol. 21, No. 2, pp. 120-126 (Feb. 1978).

Schroeppel et al., "Fast Key Exchange with Elliptic Curve Systems," *Advances in Cryptology—CRYPTO 95, Proceedings*, pp. 43-56 (1995).

Silverman, "Fast Multiplication in Finite Field GF ($2^N$)," *Cryptographic Hardware and Embedded Systems*, pp. 122-134 (1999).

Office action mailed Feb. 1, 2007 in U.S. Appl. No. 10/636,326, filed Aug. 6, 2003 (published as U.S. Patent Application Publication No. 2004/0109561).

Office action mailed Jul. 18, 2007 in U.S. Appl. No. 10/636,326, filed Aug. 6, 2003 (published as U.S. Patent Application Publication No. 2004/0109561).

Office action mailed Feb. 13, 2008, in U.S. Appl. No. 10/636,326, filed Aug. 6, 2003 (published as U.S. Patent Application Publication No. 2004/0109561).

\* cited by examiner

MULTIPLICATION OF MULTI-PRECISION NUMBERS HAVING A SIZE OF A POWER OF TWO

CROSS REFERENCE TO RELATED APPLICATIONS

This application claims the benefit of U.S. Provisional Patent Application 60/401,589, filed Aug. 6, 2002, and U.S. Provisional Patent Application 60/419,204, filed Oct. 16, 2002, both of which are incorporated herein by reference.

FIELD OF INVENTION

This application relates to the multiplication of multi-precision numbers in a variety of different applications, including cryptography.

BACKGROUND

Performing mathematical operations on large numbers can be a time-consuming and resource-intensive process. One method of handling large numbers involves dividing the numbers into smaller divisions, or words, having a fixed length. Numbers divided in this manner are termed "multi-precision" numbers. In the field of digital circuits, for instance, the binary representation of a large number can be stored in multiple words, wherein each word has a fixed length of n bits depending on the word size supported by the associated hardware or software. Although adding and subtracting multi-precision numbers can be performed relatively efficiently, multi-precision multiplication is much more complex and creates a significant bottleneck in applications using multi-precision arithmetic.

One application that requires multi-precision arithmetic is cryptography. Many public-key algorithms, including the Diffie-Hellman key exchange algorithm, elliptic curve cryptography, and the Elliptic Curve Digital Signature Algorithm (ECDSA), involve the multi-precision multiplication of large numbers. For example, elliptic curve systems perform multi-precision arithmetic on 128- to 256-bit numbers, while systems based on exponentiation employ 1024- to 2048-bit numbers.

In order to improve the performance of these and other cryptographic systems, it is desirable to improve the efficiency of the multi-precision multiplication algorithm. Any improvements, even if relatively small, can result in a significant increase in the overall performance of the application, because the multiplication algorithm can be called many times during normal operation.

SUMMARY

Methods and apparatus are disclosed for multiplying multi-precision numbers. In certain embodiments, fewer recursions are performed than in the known methods. As a result, the methods can be used to increase performance in a variety of applications that utilize multi-precision arithmetic. One particular application in which this improved performance is desirable is cryptography.

In one disclosed embodiment, a method of multiplying two operands is provided. In the method, the first operand is stored as a first array of n words. Similarly, the second operand is stored as a second array of n words. In the method, n is an integer whose value is a power of two. The first and second array may be padded with zeros so that they each have n words. The method of this embodiment further includes determining a first weighted sum from multiple subproducts of corresponding words of the first operand and the second operand. The corresponding words of the first operand and the second operand may be associated with a selected power of the radix. The first weighted sum may also include adding a word-shifted version of at least one of the subproducts. The subproducts in the first weighted sum may correspond to branches from a corresponding recursion tree. Specifically, the subproducts may correspond to low or high branches having no mid-branch ancestors. The method of this embodiment additionally includes iteratively determining a next weighted sum from a previous weighted sum and a recursively calculated intermediate product. In one of the iterations, the previous weighted sum may be equal to the first weighted sum. In certain implementations, the next weighted sum includes a shifted version of the previous weighted sum.

The disclosed methods may be used in a number of different applications that utilize multi-precision arithmetic. For example, the method can be used to generate various cryptographic parameters. In one particular implementation, for instance, a private key and a base point are multiplied using one of the disclosed methods to obtain a product that is associated with a public key. In this implementation, the private key and the base point are multi-precision numbers having n words, wherein n is an integer that is a power of two. The disclosed methods may similarly be used in a signature generation or signature verification process (e.g., the Elliptic Curve Digital Signature Algorithm (ECDSA)).

The disclosed methods may be implemented in a variety of different software and hardware environments. Any of the disclosed methods may be implemented, for example, as a set of instructions stored on a computer-readable medium. The methods may also be implemented in a variety of integrated circuits, such as a field programmable gate array.

These and other features of the disclosed technology are described below with reference to the accompanying figures.

DETAILED DESCRIPTION

Figure 1:
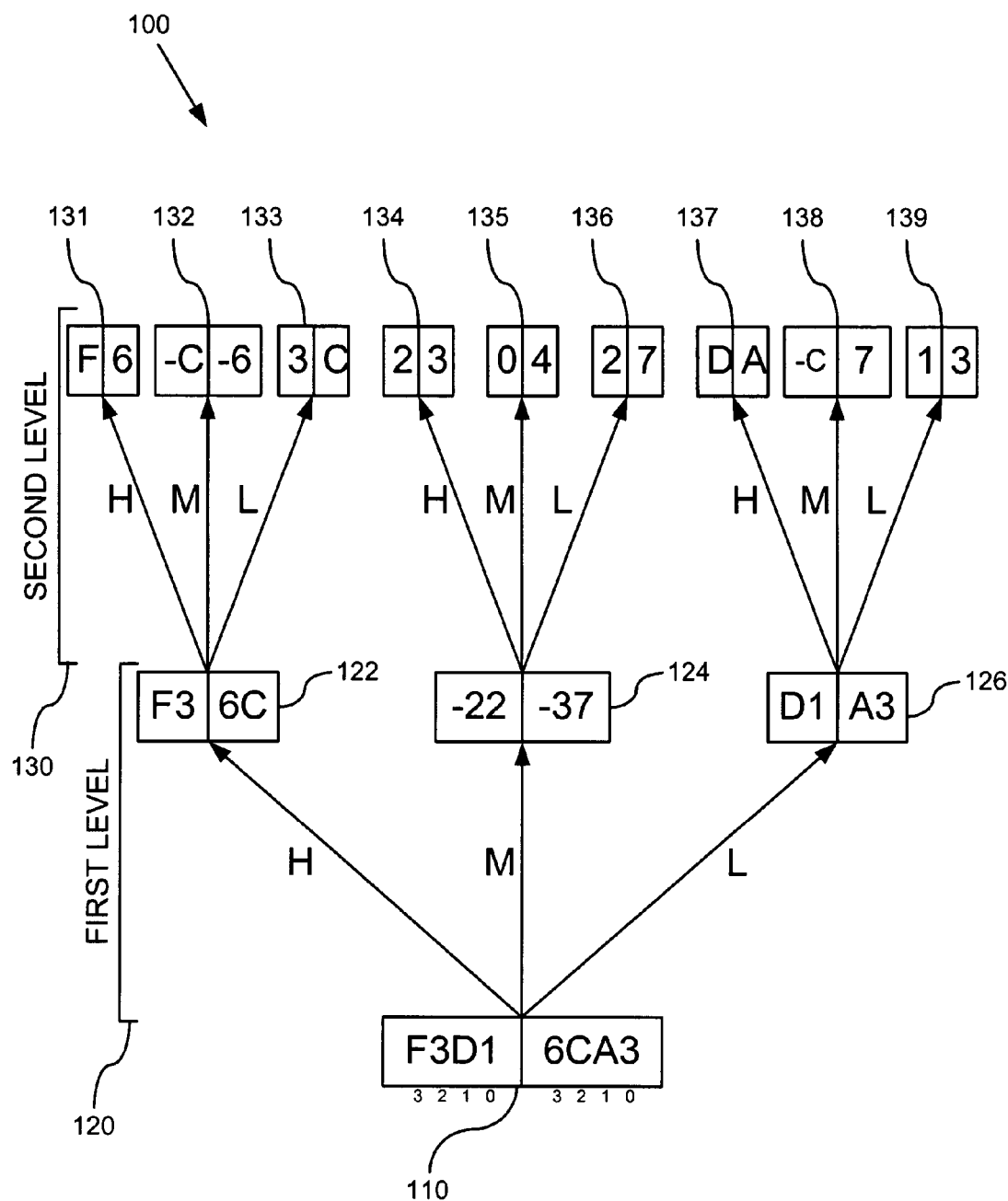
FIG. 1 is a block diagram of an exemplary recursion tree.

Disclosed below are representative embodiments that should not be construed as limiting in any way. Instead, the present disclosure is directed toward novel and nonobvious features and aspects of the various embodiments of the multi-precision multiplication methods and apparatus described below. The disclosed features and aspects can be used alone or in novel and nonobvious combinations and sub-combinations with one another.

Although the operations of the disclosed methods are described in a particular, sequential order for the sake of presentation, it should be understood that this manner of description encompasses minor rearrangements, unless a particular ordering is required. For example, operations described sequentially may in some cases be rearranged or performed concurrently. Moreover, for the sake of simplicity, the disclosed flowcharts typically do not show the various ways in which particular methods can be used in conjunction with other methods. Additionally, the detailed description sometimes uses terms like "determine" and "obtain" to describe the disclosed methods. These terms are high-level abstractions of the actual operations that are performed by a computer or digital circuit. The actual operations that correspond to these terms will vary depending on the particular implementation and are readily discernible by one of ordinary skill in the art.

As more fully described below, the disclosed methods can be implemented in a variety of different environments, including a general-purpose computer, an application-specific computer, an integrated circuit (e.g., a field programmable gate array), or in various other environments known in the art. The particular environments discussed, however, should not be construed to limit the scope of use or functionality of the disclosed methods.

General Considerations

Hardware or software implementations typically support a fixed word size. In these implementations, large numbers are typically represented as multiple words, wherein each word comprises multiple bits. As noted above, multi-word numbers are called "multi-precision" numbers and can be manipulated on a word-by-word basis using "multi-precision arithmetic."

For purposes of the present disclosure, unsigned multi-precision numbers are denoted as bold-face variables. Accordingly, let a be a number stored in n words of w bits each. The words of a are denoted as $a[0], a[1], \ldots, a[n-1]$. Further, let $a_0, a_1, \ldots, a_{nw-1}$ denote the bits of a from the least significant to the most significant. Thus, $a[i]$ contains the bits $a_{iw+j}$ for $j=0, \ldots, w-1$ and represents the 1-word number $$\sum_{j=0}^{w-1} a_{iw+j} x^j.$$

The word a can also be written in radix $z=2^w$ as follows:

$$a = \sum_{i=0}^{n-1} a[i] z^i \quad (1)$$

Alternatively, the multi-precision number can be viewed as an array of words, from the 0th word to the (n−1)th word. Multiple subarrays can also be defined from the words that constitute a given multi-precision number. In particular, let $a^l[k]$ denote the subarray containing the words $a[k+i]$ for $i=0, \ldots, l-1$ and represent the following l-word number:

$$a^l[k] = \sum_{i=0}^{l-1} a[k+i] z^i, \quad (2)$$

wherein n and l are integers, k is an index to the first word of the subarray, and l is the length of the subarray in words.

Multi-word operations used in the methods described below include: (1) adding and subtracting; (2) multiplying by powers of $z=x^w$; and (3) assigning values to subarrays. The addition and subtraction of two n-word numbers produces another n-word number, plus an extra bit. This extra bit is a carry bit for addition and a sign (or borrow) bit for subtraction. Multi-precision addition and subtraction are relatively easy operations. Further, because z is $2^w$, multiplying a number by $z^i$ is equivalent to left-shifting the words of the corresponding array by i positions. That is, the jth word becomes the (i+j)th word. Because of the shifting, the 0th through (i−1)th words are emptied and typically filled (or "padded") with zeros.

The subarray of a number can be assigned a number. For example, let a be an n-word number and b be an l-word number. Consider the following assignment:

$$a^l[k] := b \quad (3)$$

This assignment overwrites the words of a. The words $a[k+i]$ for $i=0, \ldots, l-1$ are replaced with the words $b[i]$ for $i=0, \ldots, l-1$ respectively.

The Karatsuba-Ofman Algorithm (KOA)

The classical multi-precision multiplication algorithm straightforwardly multiplies every word of the first operand by every word of the other operand and adds the partial products. This algorithm is sometimes referred to as the grade-school method and has an $O(n^2)$ complexity where n is the multiplicand size.

The Karatsuba-Ofman Algorithm ("KOA") is an alternative multi-precision multiplication algorithm. The KOA has an $O(n^{1.58})$ asymptotic complexity, and thus multiplies large numbers faster than the classical method. KOA is a recursive algorithm that uses a so-called "divide-and-conquer" strategy. The following paragraphs describe the general principles underlying the KOA.

Let a and b be two n-word numbers where n is even. The n-word numbers a and b can be split into two parts as follows:

$$a = a_L + a_H z^{n/2} \quad b = b_L + b_H z^{n/2} \quad (4)$$

where $a_L = a^{n/2}[0]$, $b_L = b^{n/2}[0]$, $a_H = a^{n/2}[n/2]$, and $b_H = b^{n/2}[n/2]$. In other words, $a_L$ and $b_L$ are the numbers represented by the low-order words (the first n/2 words), while $a_H$ and $b_H$ are the numbers represented by the high-order words (the last n/2 words).

Next, let $t=a*b$. Then, t can be written in terms of the half-sized numbers $a_L$, $b_L$, $a_H$, and $b_H$ as follows:

$$t = a \cdot b \qquad (5)$$
$$= (a_L + a_H z^{n/2})(b_L + b_H z^{n/2})$$
$$= a_L b_L + (a_L b_H + a_H b_L) z^{n/2} + a_H b_H z^n$$

As seen in Equation (5), the product t can be computed from four half-sized products: $a_L b_L$, $a_L b_H$, $a_H b_L$, and $a_H b_H$. On the other hand, the equality $a_L b_H + a_H b_L = a_L b_L + a_H b_H + (a_L - a_H)(b_H - b_L)$ can used in Equation (5) to obtain:

$$t = a_L b_L + [a_L b_L + a_H b_H + (a_L - a_H)(b_H - b_L)] z^{n/2} + a_H b_H z^n \qquad (6)$$

Equation (6) shows that three half-sized products are sufficient to compute t instead of four. These products are: $a_L b_L$, $a_H b_H$, and $(a_L - a_H)(b_H - b_L)$. Although the number of products is reduced, the number of additions and subtractions is increased. Because the complexity of adding and subtracting is linear (i.e., O(n)), however, the computation is simplified overall. Note that the multiplications by the powers of $z=2^w$ in Equation (6) need no computation. These multiplications correspond to array shifts and can be achieved by the proper indexing of the arrays representing the numbers in (6).

As shown in Equation (6), the KOA computes a product from three half-sized products. In a recursive process, KOA computes each of these half-sized products from three quarter-sized products. When the products reach some designated size, (for example, when the multiplicands are reduced to one word), the recursion stops and the products are computed using classical methods.

The following pseudocode describes an exemplary implementation of the KOA function. In the disclosed function, the inputs are assumed to be multi-word numbers that can be split evenly into lower- and higher-order words at each recursion level. Thus, the size n of each input must be a power of two. The function does not need to be limited to this special case, however, as a general function can be derived for the KOA that splits the inputs when their size n is not divisible by two.

```
         function: KOA(a, b : n-word number; n : integer)
         t : 2n-word number
         a_L, a_M, a_H : (n/2)-word number
         low, mid, high : n-word number
         begin
                 /* When the input size is one word */
Step 1:          if n = 1 then return t := a * b
                 /* Generate 3 pairs of half sized numbers */
Step 2:          a_L := a^{n/2}[0]
Step 3:          b_L := b^{n/2}[0]
Step 4:          a_H := a^{n/2}[n/2]
Step 5:          b_H := b^{n/2}[n/2]
Step 6:          (s_a, a_M) := a_L - a_H
Step 7:          (s_b, b_M) := b_H - b_L
                 /* Recursively multiply the half sized numbers */
Step 8:          low := KOA (a_L, b_L, n/2)
Step 9:          high := KOA (a_H, b_H, n/2)
Step 10:         mid := KOA (a_M, b_M, n/2)
                 /* Combine the subproducts to obtain the output */
Step 11:         t := low + (low + high + s_a s_b mid) z^{n/2} + high z^n
                 return t
         end
```

In Step 1, the size of n is considered. If it is one (i.e., if the inputs are one-word numbers) the inputs are multiplied and the result returned. Otherwise, the function continues with the remaining steps. In Steps 2 through 5, (n/2)-word numbers $a_L$, $b_L$, $a_H$, and $b_H$ are generated from the lower- and higher-order words of the inputs. In Steps 6 and 7, $a_M$, $b_M$, $s_a$, and $s_b$ are produced by the subtraction operations described below:

$$s_a = \text{sign}(a_L - a_H) \; a_M = |a_L - a_H|$$

$$s_b = \text{sign}(b_H - b_L) \; b_M = |b_H - b_L| \qquad (7)$$

The values of $a_M$, $b_M$, $\text{sign}_a$, and $\text{sign}_b$ are the magnitudes and signs of the subtractions, respectively, in Steps 6 and 7. Like $a_L$, $b_L$, $a_H$, and $b_H$, $a_M$ and $b_M$ have n/2 words. In Steps 8, 9 and 10, these n/2-word numbers are multiplied by recursive calls to the KOA function.

The values of low, high, and mid are calculated as follows:

$$\text{low} = a_L b_L$$

$$\text{high} = a_H b_H$$

$$\text{mid} = |a_L - a_H||b_H - b_L| \qquad (8)$$

In step 11, the product $t=a*b$ is found using Equation (6). In this equation, low is substituted into $a_L b_L$, high into $a_H b_H$, and $s_a s_b$ mid into $(a_L - a_H)(b_H - b_L)$. Note that $s_a s_b \text{mid} = (s_a |a_L - a_H|)(s_b |b_H - b_L|) = (a_L - a_H)(b_H - b_L)$.

The Karatsuba-Ofman Algorithm with Two's-Complement Arithmetic

In a typical computer-based implementation of the KOA, multi-word additions and subtractions are performed on a word-by-word basis using two's-complement arithmetic. The exemplary KOA function described above represents multi-word numbers in sign-magnitude form and does not describe the details of multi-word additions and subtractions. In this section, the KOA function is implemented using two's-complement representations for multi-word numbers.

The following pseudocode describes an exemplary implementation of the KOA function using two's-complement arithmetic.

```
         function: KOAcomp (a, b : n-word number; n : integer)
         t : 2n-word number
         a_L, a_M, a_H : (n/2)-word number
         low, mid, high : n-word number
         begin
                 /* When the input size is one word */
Step 1:          if n = 1 then return t := a * b
                 /* Generate 3 pairs of half sized numbers */
Step 2:          a_L := a^{n/2}[0]
Step 3:          b_L := b^{n/2}[0]
Step 4:          a_H := a^{n/2}[n/2]
Step 5:          b_H := b^{n/2}[n/2]
Step 6:          (b_a, a_M) := a_L - a_H
Step 7:          (b_b, b_M) := b_H - b_L
Step 8:          if b_a = 1 then a_M := NEG(a_M)
Step 9:          if b_b = 1 then b_M := NEG(b_M)
                 /* Recursively multiply the half sized numbers */
Step 10:         t^n[0] := KOAcomp(a_L, b_L, n/2)
Step 11:         t^n[n] := KOAcomp(a_H, b_H, n/2)
Step 12:         mid := KOAcomp (a_M, b_M, n/2)
                 /* Combine the subproducts to obtain the output */
                 If b_a = b_b then
Step 13:                 (c, mid) := t^n[0] + t^n[n] + mid
                 else
Step 14:                 (c, mid) := t^n[0] + t^n[n] - mid
Step 15:         (c', t^n[n/2]) := t^n[n/2] + mid
Step 16:         t^{n/2}[3n/2] := t^n[3n/2] + c' + c
                 return t
         end
```

The functions KOA and KOAcomp first differ in Steps 6 and 7. In these steps, subtractions produce the results in two's-complement form. The subtraction $a_L - a_H$ produces the (n/2)-word number $a_M$ and the 1-bit borrow $b_a$. Similarly, the subtraction $b_H-b_L$ produces the (n/2)-word number $b_M$ and the 1-bit borrow $b_b$. The NEG function seen in Step 8 and 9 performs a negation operation, which is a two's-complement operation. In these steps, $b_a$ and $b_b$ are checked to determine the signs of $(a_L-a_H)$ and $(b_H-b_L)$. If $b_a=1$ and $b_b=1$, the values of $(a_L-a_H)$ and $(b_H-b_L)$ are negative and $a_M$ and $b_M$ are negated. In two's-complement form, the magnitude of a number is itself if it is positive, or its negation if it is negative. As a result, Steps 8 and 9 provide that $a_M=|a_L-a_H|$ and $b_M=|b_L-b_H|$.

In Steps 10, 11, and 12, the products of $a_L b_L$, $a_H b_H$, and $a_M b_M = |a_L-a_H||b_L-b_H|$ are found. In these steps, the product $a_M b_M$ is stored into mid, while the products $a_L b_L$ and $a_H b_H$ are stored into respective lower and higher halves of the output array t (t''[0] and t''[n]). In contrast to the KOA function, the local variables low and high are not defined or used, resulting in fewer memory resources being used.

In Steps 13 and 14, the sum $a_L b_H + a_H b_L = a_L b_L + a_H b_H + (a_L - a_H)(b_H - b_L)$ is found. The result is stored into the n-word variable mid and the 1-bit carry c. In this computation, t''[0] and t''[n] (which contain $a_L b_L$ and $a_H b_H$) are added together. Moreover, if $b_a=b_b$, mid=$|a_L-a_H||b_L-b_H|$ is added to the sum. Otherwise, mid is subtracted from the sum. In essence, then, $(a_L-a_H)(b_H-b_L)$ is added to the sum. Accordingly, (c, mid)= $a_L b_L + a_H b_H + (a_L-a_H)(b_H-b_L)$ and $t = a_L b_L + a_H b_H z^n$.

In Steps 15 and 16, t is added to the term $[a^L b_L + a_H b_H + (a_L-a_H)(b_H-b_L)]z^{n/2}$ so that t=a*b. To perform this operation, the subarray t''[n/2] is added to mid in Step 15. This addition yields the carry-bit c'. Then, the carry bits c and c' are propagated through the most significant n/2 words of t in Step 16.

Complexity of the KOA

In this section, the complexity of the exemplary KOAcomp function is determined. In the complexity analysis that follows, the cost of manipulating the carry and borrow bit is ignored because it is small in comparison to the multi-word operations.

The following table gives the numbers of word-operations, word-reads, and word-writes needed when the input length is n>1. The first, second, and third columns give the number of word-operations, memory reads, and memory writes, respectively. Steps 2 through 5 are ignored because $a_L$, $a_H$, $b_L$, and $b_H$ are just copies of the lower and higher halves of the inputs. In practice, pointers to the lower and higher halves of the inputs are used instead of copies. The KOAcomp function performs two n/2-word subtractions in Steps 6 and 7, two n-word additions in Step 13 (or one n-word addition and one n-word subtraction in Step 14), one n-word addition in Step 15, and one n/2-word addition with an input carry in Step 16. The function also performs an n/2-word negation in Step 8 if

TABLE 1

The complexity of a recursive call with the input length n > 1.

| Step No. | Operation | Read | Write |
|---|---|---|---|
| 6, 7 | n | 2n | n |
| 8, 9 | n/2 | n/2 | n/2 |
| 10, 11, 12 | recursions | | |
| 13, 14 | 2n | 4n | 2n |
| 15 | n | 2n | n |
| 16 | n/2 | n/2 | n/2 |
| Totals | 5n | 9n | 5n |

$b_a=1$, and another one in Step 9 if $b_b=1$. Assuming that $b_a$ and $b_b$ are equally probable to be one or zero, each recursive call averages one n/2-word negation.

For each multi-word operation, the number of word-writes is equal to the number of word-operations, while the number of word-reads is equal to the number of word-operations multiplied by the number of multi-word operands.

In Steps 10, 11, and 12, there are three recursive calls with half-sized inputs. Consequently, the complexity T(n) can be found as follows:

$$T(n) = 3T(n/2) + \mu n \quad (9)$$

where $\mu n$ is the total number operations (the reads and writes given in Table 1). Thus, $\mu n = 5n + 9n + 5n = 19n$. Using Equation (9), and assuming $n=2^k$ for some integer k:

$$\begin{aligned} T(n) &= 3^k T(1) + [(3/2)^{k-1} + \ldots + (3/2)^2 + 3/2 + 1]\mu n \\ &= 3^k T(1) + [1 + 2/3 + (2/3)^2 + \ldots + (2/3)^{k-1}]\mu n (3/2)^{k-1} \\ &= 3^k T(1) + 3[1 - (2/3)^k] \mu n (3/2)^{k-1} \\ &= 3^k [T(1) + 2\mu] - 2\mu n \end{aligned} \quad (10)$$

where T(1) is the complexity of one-word multiplication. Moreover, $3^k = (2^k)^{\log_2 3} = n^{\log_2 3} \approx n^{1.58}$. Thus, $$T(n) = n^{1.58}[T(1) + 2\mu] - 2\mu n. \quad (11)$$

Recursivity of KOA

Consider the multiplication of $n=2^k > 1$ word numbers with the KOA, where k is some integer. Let r(n) be the number of recursions needed for this computation. The initial call makes three recursive calls with n/2-word inputs. These three recursive calls each lead to r(n/2) recursions. Thus, the following recurrence may be calculated:

$$\begin{aligned} r(n) &= 3 + 3r(n/2) \\ &= 3 + 9 + \ldots + 3^k + 3^k r(1) \\ &= 3 + 9 + \ldots + 3^k = 3(3^k - 1)/2. \end{aligned} \quad (12)$$

Recursion Tree Analysis and Terminology

A recursion tree is a diagram that depicts the recursions in an algorithm. Recursion trees can be particularly helpful in the analysis of recursive algorithms like the KOA that may call themselves more than once in a recursion step.

The recursion tree of an algorithm can be thought of as a hierarchical tree structure wherein each branch represents a recursive call of the algorithm. FIG. 1 shows an exemplary recursion tree 100 that depicts the multiplication of two exemplary operands using an algorithm similar to the KOA. In the example shown in FIG. 1, the hexadecimal numbers "F3D1" and "6CA3" are multiplied. The initial call to the algorithm is represented by the root 110 of the tree 100. The recursive calls made by the initial call constitute the first level of recursion 120 and are represented by the first-level branches 122, 124, 126 emerging from the root 110. The recursive calls made by the branches 122, 124, 126 constitute a second level of recursion 130 and are represented in the recursion tree 100 by the second-level branches 131 through 139 emerging from the first-level branches 122, 124, 126. This process of recursion may continue until a final recursion level is reached, but in the illustrated example extends only two recursion levels. A branch emerging from another branch may be called a "child." Similarly, the branch from which the child stems may be called the "parent." In FIG. 1, for instance, branch 131 is the child of branch 122. In the recursion tree, if a branch represents a particular recursive call, its children represents the recursive calls made by that call. In other words, a "caller-callee" relationship in an algorithm corresponds to a "parent-child" relationship in the recursion tree. If a recursive call made at some recursion level makes no further recursive calls, the branch representing it in the tree has no children, and may be called a "leaf."

In the recursion tree depicted in FIG. 1, three recursive calls are made by each of the three branches 122, 124, and 126. Thus, three branches emerge from each preceding branch. The leaves 131-139 represent multiplications of one-word inputs, which do not make any recursive calls because they can be easily calculated using classical methods. Generally speaking, the size of the input parameters are reduced by half in each successive recursion level in the recursion tree. Thus, at some level, the branches will have one-word inputs and cease to make any further recursive calls.

Recursive tree terminology may be used to describe the KOA or a similar divide-and-conquer algorithm. For example, if one recursive call invokes another, the first recursive call may be referred to as the parent, and the latter recursive call as the child. Thus, a branch may be used as a synonym for a recursive call, and a leaf as a synonym for a recursive call with one-word inputs. Additionally, a path is defined as a sequence of branches from the root in which each branch is a child of the previous one.

Consider the branch 122 in the KOA. This branch is a call to the KOA function described above. It has two inputs, "F3" and "6C". From these inputs, the branch 122 generates the half-sized pairs $(a_L, b_L)$, $(a_H, b_H)$, and $(a_M, b_M)$ (or (3,C), (F,6), and (−C,−6), respectively). Its children take these pairs as inputs, multiply them, and return the subproducts low, mid, and high in Steps 8 through 10.

In the KOA, there are three choices for a branch. A branch either takes the input pair $(a_L, b_L)$ from its parent and returns the subproduct low, takes the input pair $(a_H, b_H)$ and returns the subproduct high, or takes the input pair $(a_M, b_M)$ and returns the subproduct mid. For purposes of this disclosure, these first, second, and third types of branches are called low, high, and mid branches respectively. This classification of the branches is given in Table 2 below.

TABLE 2

The classification of the branches in the tree

| | |
|---|---|
| LOW BRANCH | takes the input pair $(a_L, b_L)$ from its parent returns the subproduct low to its parent |
| HIGH BRANCH | takes the input pair $(a_H, b_H)$ from its parent returns the subproduct high to its parent |
| MID BRANCH | takes the input pair $(a_M, b_M)$ from its parent returns the subproduct mid to its parent |

In each recursion level k, a special set of branches $B_k$ also exists. The common property of the branches in this set is that their ancestors and themselves are not mid branches. The root satisfies this property because it has no ancestor and is not a mid branch. On the other hand, a branch in a further recursion level satisfies this property if itself and all its ancestors, except the root, are low and high branches. Thus, $B_k$ for $k \geq 0$ can be defined as follows:

Definition 1: $B_0$ is the set whose only element is the root. $B_k$ for $k \geq 1$ is a set of branches at the kth recursion level whose ancestors, except the root, are are all low and high branches.

The branches in the set $B_k$ constitute "paths" of low and high branches starting from the root. These paths are unique for each branch in the set $B_k$. Using this fact, a unique element number for the branches in the set $B_k$ can be defined as follows:

Definition 2: The element number of the root in the set $B_0$ is zero. The element number of a branch in the set $B_k$ for $k \geq 1$ is a k-digit binary number $i=(i_1 i_2 \ldots i_j \ldots i_k)_2$ where $i_j$ is the jth most significant digit. In this number, if the branch is a high branch, $i_k$ is 1. If the branch is a low branch, $i_k$ is 0. Similarly, if the branch's ancestor in the jth recursion level is a high branch, $i_{j<k}$ is 1, and if the ancestor is a low branch, $i_{j<k}$ is 0.

Definition 3: For purposes of this disclosure, $B_{k,i}$ denotes the branch in the set $B_k$ with the element number i. Like any other branch, $B_{k,i}$ computes the product of its inputs as an output. The product computed by this branch is denoted by $P_{k,i}$.

The following proposition gives the inputs of the branches in the set $B_k$ for the case in which the input length of the root is specially chosen:

Proposition 1: Let n be the input size of the root such that $2^k | n$ for some integer $k \geq 0$. Then, the inputs of $B_{k,i}$ are the m-word numbers $a^m[im]$ and $b^m[im]$ where $m=N/2^k$. Also, the output of $B_{k,i}$ is the 2m word product $P_{k,i}=a^m[im]b^m[im]$.

The proof for this proposition proceeds as follows. Consider a branch in $B_k$ and its ancestors. The branches constitute a path of low and high branches starting from the root. As more fully explained below, these branches each have inputs in the form of $a^{length}[index]$, $b^{length}[index]$ for some integers index and length. The low and high branches have, respectively, the input pairs $(a_L, b_L)$ and $(a_H, b_H)$ generated by their parent. These are the lower- and higher-order words, or subarrays, of the parent's inputs. Then, if a path starting from the root always traverses low and high branches, the inputs of the branches on this path will all be single subarrays of the root's inputs a and b. Thus, the inputs of these branches are a subarray of a and a subarray of b. Moreover, these subarrays have the same index and length. This is because the first and the second inputs are generated in Steps 2 to 7 in the same way, except that the former is generated from the words of a and the latter is generated from the words of b.

The inputs in the form $a^{length}[index]$, $b^{length}[index]$ can be identified by their index and length parameters. In the remaining part of the proof, these parameters are investigated for the inputs of the branches in the special sets and the inputs of their ancestors. Let $0 \leq j \leq k$. Then, $2^j | n$ and the inputs are evenly divided in half for each recursion level. Thus, the input length of a branch in the jth recursion level is exactly $n/2^j$ words. Now, consider a branch in the set $B_k$ with the element number i. As more fully explained above, its inputs and its ancestor's inputs can be given as $a^{n/2^j}[index_j]$, $b^{n/2^j}[index_j]$ where $0 \leq j \leq k$ and $index_j$ is some appropriate integer. These expressions must yield the root's inputs for $j=0$ (i.e., $a^n[index_0]=a$ and $b^n[index_0]=b$). Then, $index_0=0$. The ancestor in the jth recursion level is either a low or a high child of the one in the (j−1)th recursion level. Thus, its inputs are either the lower or higher halves of the inputs of the one in the (j−1)th recursion level. In the former case, $index_j=index_{j-1}$. In the latter case, $index_j=index_{j-1}+n/2^j$. Note that $index_j=index_{j-1}+i_j n/2^j$ for both cases where $i_j$ is the jth digit of the element number i.

Using this equation, the following equality can be obtained:

$$\begin{aligned}index_k &= index_0 + \sum_{j=0}^{k} i_j n/2^j \\ &= index_0 + \left(\sum_{j=1}^{k} i_j 2^{k-j}\right) n/2^k \\ &= index_0 + (i_1 i_2 \cdots i_k)_2 m \\ &= index_0 + im = im\end{aligned} \quad (13)$$

It can be seen from this equation that $a^{n/2^j}[index_j]$ and $b^{n/2^j}[index_j]$ yield $a'''[im]$ and $b'''[m]$ for j=k. Thus, the inputs of a branch in the set $B_k$ with the element number i are $a'''[im]$ and $b'''[im]$. And, the output of this branch is the product $P_{k,i}=a'''[im]b'''[im]$, and the proof is complete.

The following proposition describes the children of the branches in the special sets for which the input length of the root is a power of two.

Proposition 2: Let n be the input size of the root such that $2^k|n$ for some integer $k \geq 0$. Consider the branch $B_{k-1,i}$ where $m=n/2^k$. For this branch, the low child is $B_{k,2i}$, the high child is $B_{k,2i+1}$, and the mid child has the inputs $|a'''[2im]-a'''[(2i+1)m]|$ and $|b'''[(2i+1)m]-b'''[2im]|$.

The proof for this proposition proceeds as follows. Assume that k−1>0. Definiton 1 implies that if a branch is in the set $B_{k-1}$, its low and high children are in the set $B_k$. According to Definition 2, the element number of such a branch is a (k−1)-digit number and those of its children are k-digit numbers. Note that the children and the parent share the same ancestry. It follows from Definition 2 that the most significant k−1 digits are the same for the element numbers of a branch in $B_{k-1}$ and its children in $B_k$. Then, if the element number of the branch is i, the element numbers of its children are $2i+i_k$ where $i_k$ is the least significant digit of these element numbers. According to Definition 2, $i_k=0$ for the low child, and $i_k=1$ for the high child. It follows that the element numbers of the low and high children are 2i and 2i+1, respectively, as stated in the proposition above. Since the element numbers of these children are known, their inputs can be found from Proposition 1. The inputs of the low child are $a_L=a'''[2im]$ and $b_L=b'''[2im]$, while those of the high child are $a_H=a'''[(2i+1)m]$ and $b_H=b'''[(2i+1)m]$. The inputs of the mid child were defined above as $a_M=|a_L-a_H|$ and $b_M=|b_H-b_L|$. Substituting the values of $a_L$, $b_L$, $a_H$, and $b_H$ yields $a_M=|a'''[2im]-a'''[(2i+1)m]|$ and $b_M=|b'''[(2i+1)m]-b'''[2im]|$. Thus, the inputs of the mid child can be written as in Proposition 2.

If k−1=0, $B_{k-1}$ is $B_0$, the set whose only element is the root. The arguments in the proof are valid for this case as well, except that the element number of the root is not, and cannot, be a k−1=0 digit number. This condition, however, does not affect the above proposition.

Every branch in the KOA has two inputs and computes their product as an output. However, the branches in the KOA do not compute the products of their inputs by directly multiplying them unless the branch is a leaf of the recursion tree. Instead, the branches compute the products by appropriately shifting and adding the recursively determined subproducts computed by the branches' children. This computation is performed in Step 11 of the KOA function described above. The equation in this step expresses the product computed by a branch in terms of the subproducts computed by its children. Using the equation in Step 11, the product of a branch can be decomposed in terms of the special sets of branches described above. The following proposition illustrates this decomposition for the case in which the input length of the root is specially chosen to be an integer power of two:

Proposition 3: Let n be the input size of the root such that $2^k|n$ for some integer $k \geq 0$. Then, we can decompose $P_{k-1,i}$ into subproducts as follows $$P_{k-1,i}=(1+z^m)(P_{k,2i}+z^m P_{k,2i+1})+z^m s_a s_b \text{mid} \quad (14)$$

where $m=n/2^k$, mid=$|a'''[2im]-a'''[(2i+1)m]|\cdot|b'''[(2i+1)m]-b'''[2im]|$, and $s_a=\text{sign}(a'''[2im]-a'''[(2i+1)m])$ and $s_b=\text{sign}(b'''[(2i+1)m]-b'''[2im])$.

The proof of this proposition proceeds as follows. Consider the branch $B_{k-1,i}$. Because it is in the (k−1)th recursion level, this branch has inputs of $(n/2^{k-1}=2m)$ words. According to Definition 3, the branch computes the product $P_{k-1,i}$. As can be understood from the KOA function described above, the product $P_{k-1,i}$ can be decomposed into the following subproducts:

$$P_{k-1,i}=\text{low}+(\text{low}+\text{high}+s_a s_b \text{mid})z^m+\text{high } z^{2m} \quad (15)$$

Note that the low and high children of $B_{k-1,i}$ are $B_{k,2i}$ and $B_{k,2i+1}$ according to Proposition 2. Also, note that $B_{k,2i}$ and $B_{k,2i+1}$ compute the products $P_{k,2i}$ and $P_{k,2i+1}$. Thus, the substitutions low=$P_{k,2i}$ and high=$P_{k,2i+1}$ can be made in the above equation. After these substitutions and a little bit rearrangement, Equation (14) can be obtained.

As noted above, the low and high children are $B_{k,2i}$ and $B_{k,2i+1}$. Thus, according to Proposition 1, the inputs of the low child are $a_L=a'''[2im]$ and $b_L=b'''[2im]$, while those of the high child are $a_H=a'''[(2i+1)m]$ and $b_H=b'''[(2i+1)m]$. Note that mid=$|a_L-a_H|\cdot|b_H-b_L|$, $s_a=\text{sign}(a_L-a_H)$, and $s_b=\text{sign}(b_H-b_L)$ are defined above. Substituting the values of $a_L$, $b_L$, $a_H$, and $b_H$, the same definitions for mid, $s_a$, and $s_b$ as in Proposition 14 can be obtained.

Alternate Methods of Multi-Precision Multiplication

In this section, new methods for multiplying multi-word numbers are described. Although the methods are described in terms of particular embodiments, the particular embodiments discussed are not limiting and may vary in their implementation details.

Figure 2:
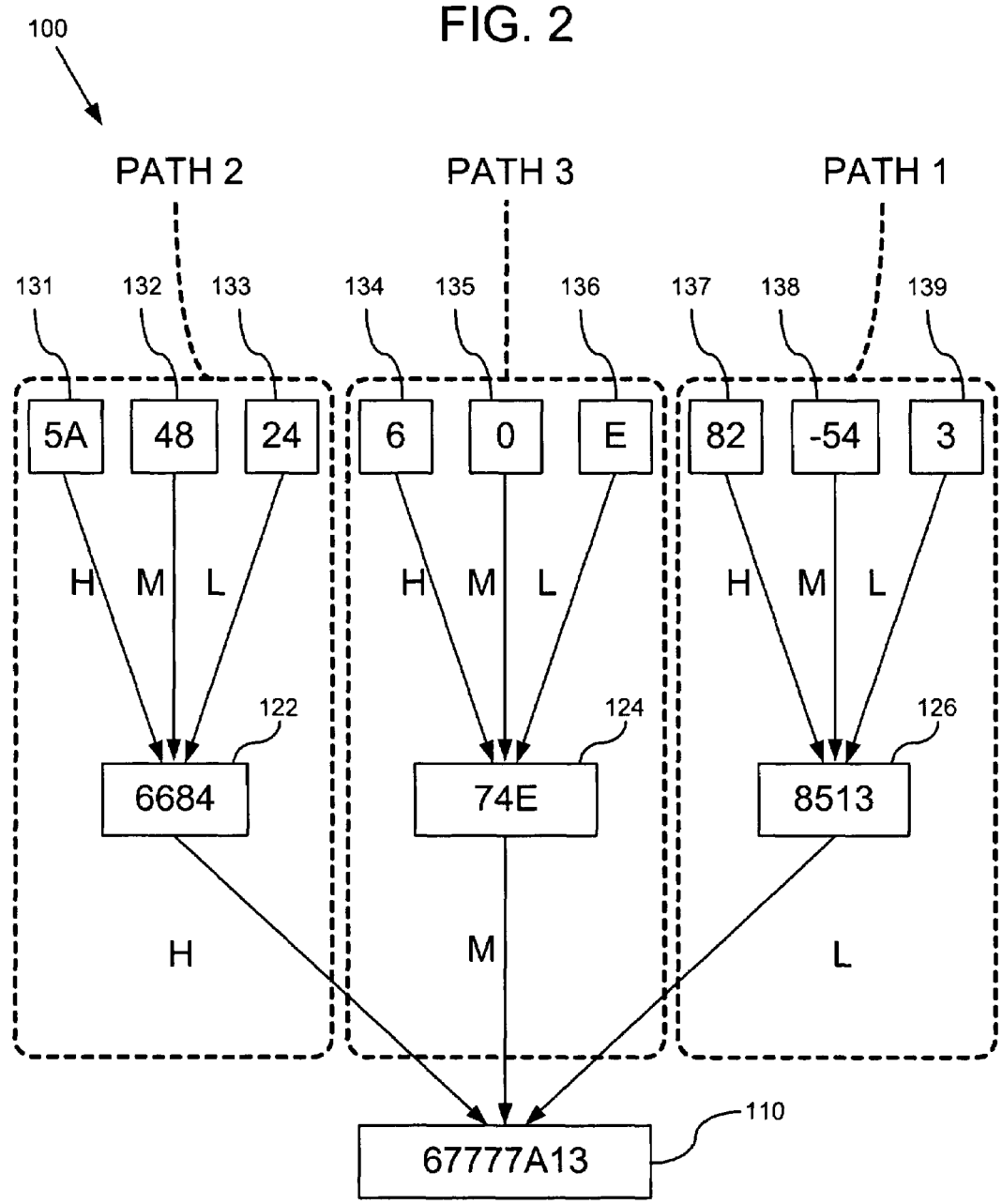
FIG. 2 is a block diagram illustrating the operation of the Karatsuba-Ofman algorithm using the recursion tree of FIG. 1.

In the KOA, a branch in some recursion level computes a product and benefits from the computations performed by its descendants in later recursion levels. This branch, however, is completely independent from the other branches in the same recursion level. FIG. 2 illustrates how the KOA calculates independent paths during the multiplication operation. In particular, FIG. 2 shows how the KOA multiplies the operands from FIG. 1. According to the KOA function described above, the algorithm first determines the product of the low branch 126 at step 8. To perform this calculation, the KOA function recursively calls itself to multiply "D1" and "A3" together. Because the low, mid, and high children from branch 126 are single-word products, the multiplication is performed using classical methods at the leaves 137, 138, and 139. The products "82," "−54," and "3," respectively, are returned to branch 126 and combined in Step 11 of the recursive KOA function to obtain the result "8513". Because this result is obtained before branches 122 and 124 are calculated, this path is designated as Path 1 in FIG. 2. According to the KOA function described above, the high branch 122 is the next branch to be calculated in Step 9, followed by the mid branch 124 in Step 10. These subsequent recursive operations are labelled as Paths 2 and 3 in FIG. 2 and obtain their respective products in a fashion similar to that of Path 1. The KOA function combines the result from the branches 122, 124, 126 in Step 11, which provides that t:=low+(low+high+$s_a s_b$mid) $z^{n/2}$+high $z^n$, and returns the final product "67777A13."

In some of the embodiments described below, computations that are performed by branches on independent paths of the corresponding recursion tree are combined. In other words, branches that do not have a common parent are combined. In certain implementations, for instance, the branches that are combined are those in the special sets defined above.

Figure 3:
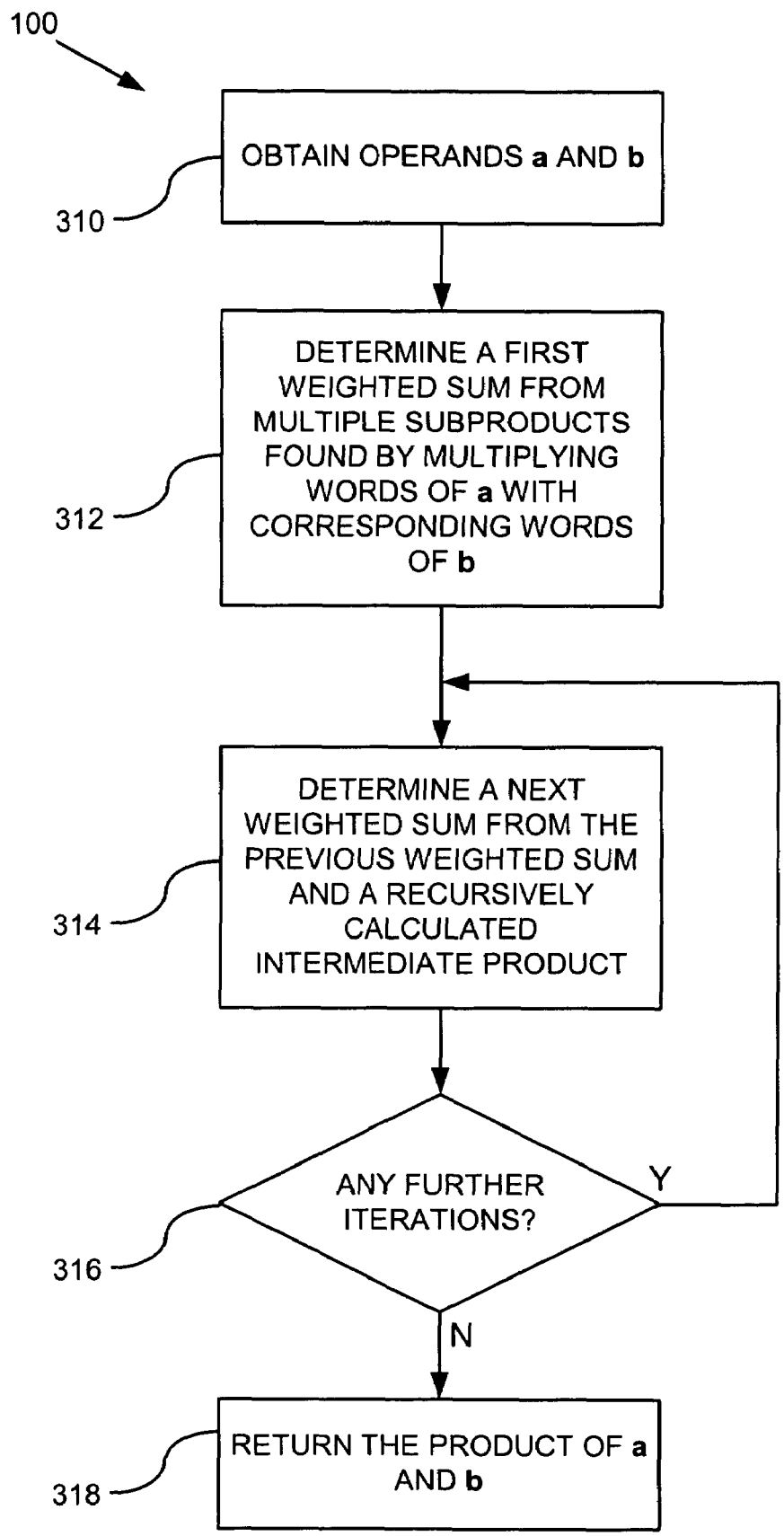
FIG. 3 is a flowchart showing a general method of multiplying multi-precision operands.

FIG. 3 is a flowchart of a general method 300 for multiplying operands. At process block 310, operands a and b are obtained and stored (e.g., in computer memory). In certain embodiments, the operands a and b are evaluated and, if necessary, stored as operands having n words, wherein n is an integer that is a power of two. For example, operands a and b may be manipulated such that they have n words. In one particular implementation, for instance, one or both of the operands from process block 310 are padded with zeros to have n words. In process block 312, a first weighted sum is determined. The weighted sum is comprised of multiple subproducts that result from multiplying the words of operand a with the words of operand b. As more fully described below, the subproducts comprise computations from at least two independent paths of the corresponding recursion tree. Thus, the general method in FIG. 3 combines subproducts that are obtained in independent paths of the KOA. In process block 314, another weighted sum is calculated. This weighted sum is determined in part from a previously calculated weighted sum and a subproduct resulting from a recursive call to the general method 300. In the first iteration, the previously calculated weighted sum is the first weighted sum from process block 312. In subsequent iterations, however, the previously calculated weighted sum may be the weighted sum from the immediately previous iteration. In process block 316, a determination is made as to whether any further iterations are necessary. This determination may depend on the word size of the original operands a and b. If further iterations are required, process block 314 is repeated. If no further iterations are required, the weighted sum determined at process block 314 is the final product, and this value is returned at process block 318. The value may, for example, be returned to a user, stored in memory, or used in further processing.

Figure 4:
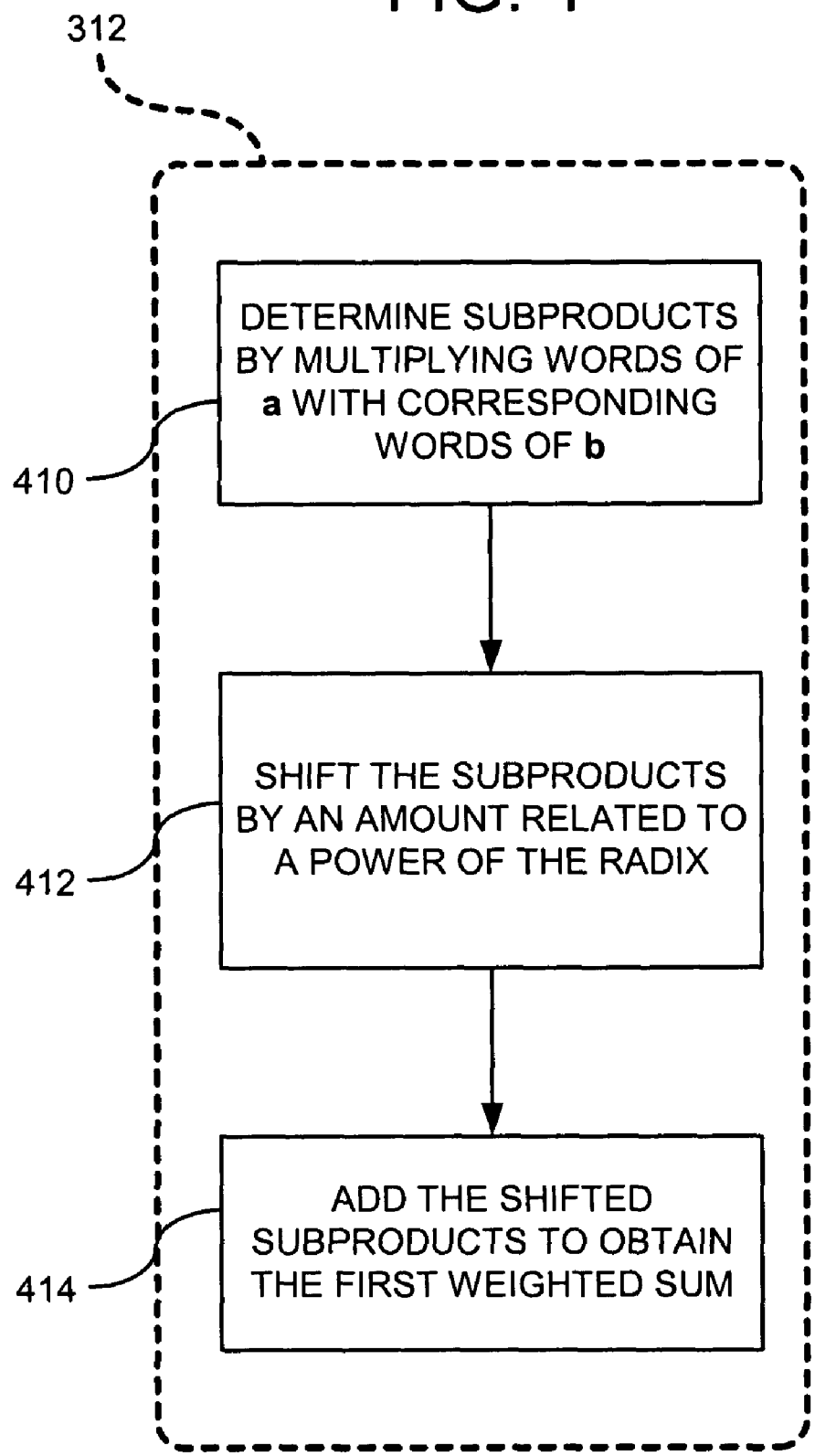
FIG. 4 is a flowchart showing a general method of performing process block 312 from FIG. 3.

FIG. 4 is a flowchart showing an exemplary general method 400 of performing the operation in process block 312 of determining a first weighted sum. At process block 410, multiple subproducts are found by multiplying the individual words of operand a with corresponding words from operand b. As more fully described below, the corresponding words in operand b may have the same position relative the radix as the words in operand a. These subproducts may be obtained using classical multiplication methods because they involve multiplying individual words. At process block 412, the multiple subproducts from process block 412 are shifted into a predetermined alignment. For example, in one particular implementation, the subproducts are shifted by an amount related to a power of the radix of the words. For instance, if the hexadecimal words "3" and "C" from the input operands "F3D1" and "6CA3" are multiplied, their product may be left shifted by two words, or eight bits. This shift corresponds to multiplying the result by the square of the radix (i.e., $16^2$ or $z^2$ for $z=2^w=2^4$). Once the subproducts have been shifted by the appropriate amount, the subproducts are added together at process block 414. Because of the shifting of process block 412, the sum obtained at process block 414 is not an ordinary sum.

Figure 5:
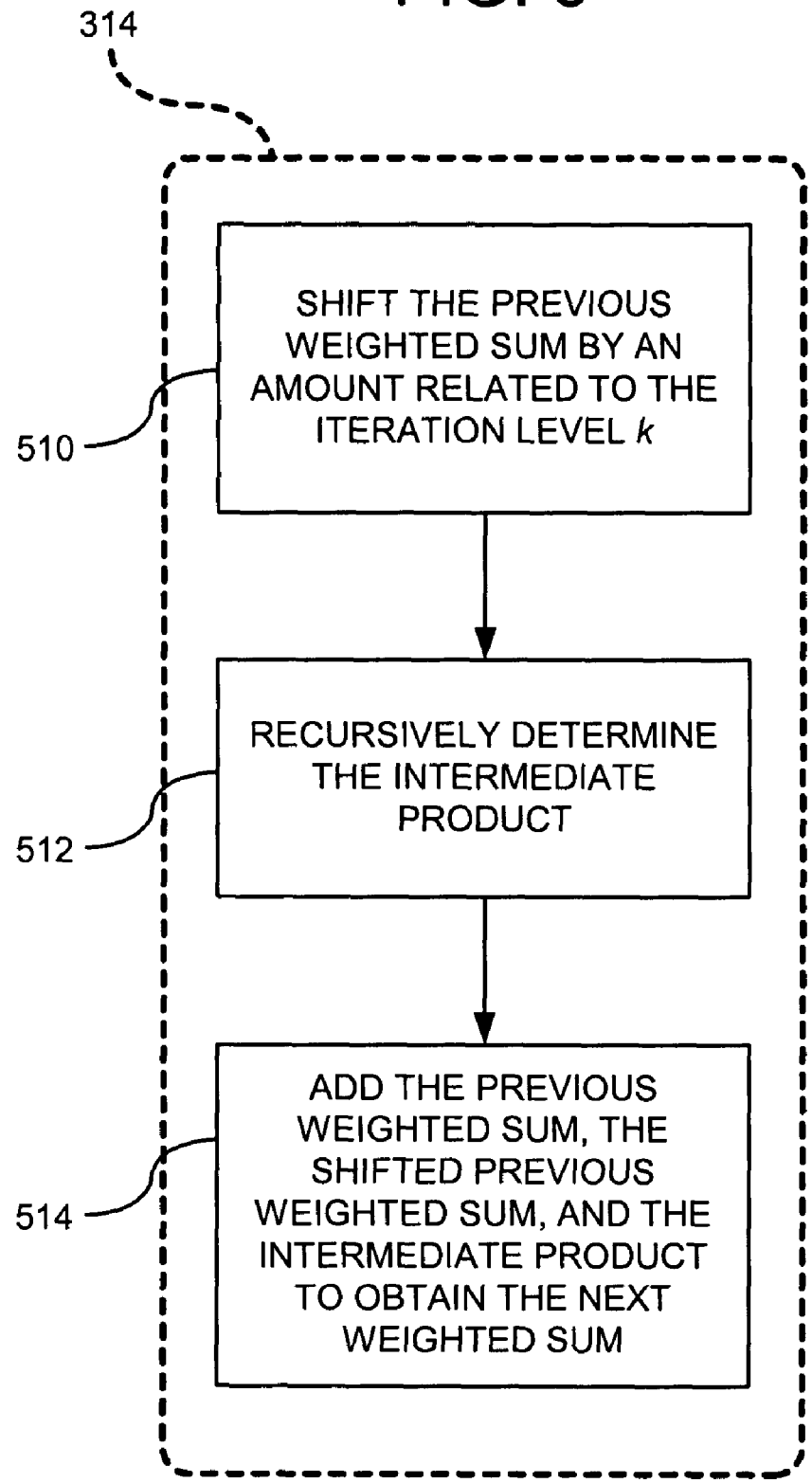
FIG. 5 is a flowchart showing a general method of performing process block 314 from FIG. 3.

FIG. 5 is a flowchart showing an exemplary general method 500 of performing the operation in process block 314 of determining a next weighted sum. At process block 510, a shift is performed on the previous weighted sum. The amount of the shift is related to the particular iteration being performed. For example, in one implementation, the previous weighted sum is shifted by $n/2^k$ where $k=\log_2 n$ and n is the number of words in the operands being multiplied in that particular iteration. Thus, for example, if the first iteration involves multiplying operands "F3D1" and "6CA3," then $k=\log_2 4=2$, and the previous weighted sum (i.e., the first weighted sum determined) is shifted by $4/2^2=1$. In process block 512, an intermediate product is determined by a recursive call to the general method 300 described in FIG. 3. In one particular implementation, the intermediate product determined is $(a_L-a_H)(b_H-b_L)$, which corresponds to a mid branch of the equivalent recursion tree. Because this is a recursive step that may lead to further recursions, depending on the size of the operands, the values of the previous weighted sum can be stored until the subsequent recursions return the value of the desired intermediate product. In process block 514, the next weighted sum is obtained by adding the previous weighted sum, the shifted version of the previous weighted sum obtained in process block 510, and the recursively determined intermediate product obtained in process block 512.

Figure 6:
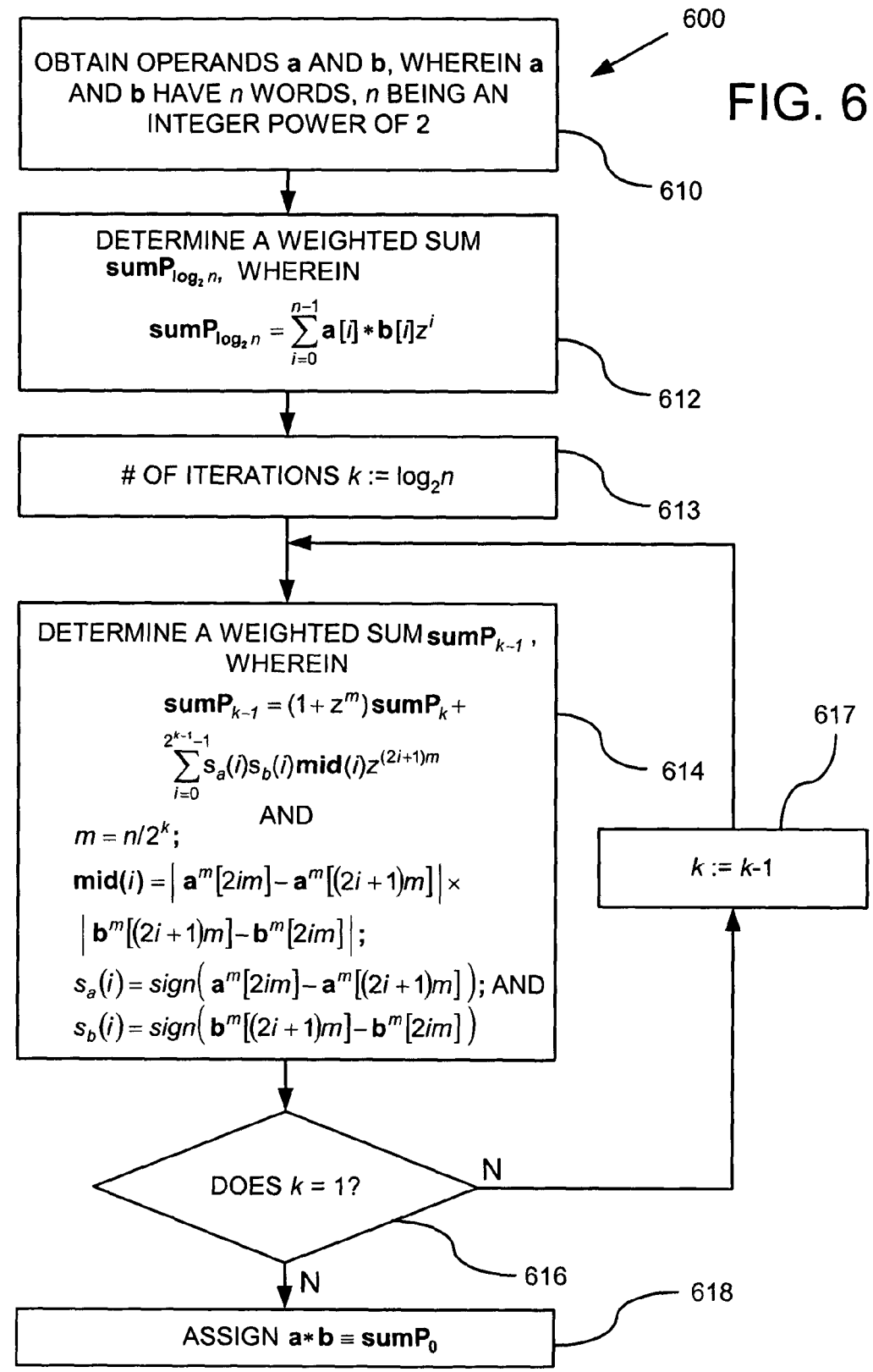
FIG. 6 is a flowchart showing a particular implementation of a method of multiplying multi-precision operands.

One exemplary embodiment 600 of the general method 300 is shown in FIG. 6 and discussed in greater detail below. Generally speaking, the exemplary embodiment 600 uses weighted sums of the subproducts computed by the branches in each special set. These weighted sums are denoted by $\text{sumP}_k$ for $k \geq 0$ and their weights are the powers of $z=2^w$. The definitions of $\text{sumP}_k$ for $k \geq 0$ are described below.

Definition 4: Let n be the input size of the root such that $2^k | n$ for some integer $k \geq 0$. The value of $\text{sumP}_k$ is equal to the following weighted sum of the products $P_{k,i}$ for $i=0, \ldots, 2^k-1$:

$$\text{sum } P_k = \sum_{i=0}^{2^k-1} P_{k,i} z^{i(n/2^k)} \tag{16}$$

Note that i is a k-digit number. That is, $0 \leq i \leq 2^k-1$. This is because i is the element number of $B_{k,i}$.

It can be seen from Definition 16 that if the input size of the root is divisible by $2^k$ (i.e., $2^k | n$), $\text{sumP}_k$, $\text{sumP}_{k-1}$, ..., $\text{sumP}_1$, $\text{sumP}_0$ are all defined. Among these weighted sums, $\text{sumP}_0$ is of particular interest because it equals the product computed by the root $P_{0,0}$:

$$\text{sum } P_0 = \sum_{i=0}^{2^0-1} P_{0,i} z^{i(n/2^0)} = P_{0,0} \tag{17}$$

The value of $\text{sumP}_0$ is the final result of the multiplication.

In the KOA, the $P_{k,i}$ for $i=0, \ldots, 2^{k-1}$ are computed by the branches in $B_k$ individually. In the method of FIG. 6, however, the products are not individually computed, but are included in a weighted sum $\text{sumP}_k$. In this way, computations performed by the branches in $B_k$ are combined.

In process block 610 of FIG. 6, operands a and b are obtained. In this embodiment, the input size of the root operands is limited to n words, where n is an integer divisible by 2. The operands may be padded with zeroes to obtain the proper size. The recursion depth is given by $\log_2 n$, and $\text{sumP}_k$ can be defined for all recursion levels k from 0 to $\log_2 n$.

In process block 612, a weighted sum $\text{sumP}_{\log_2 n}$ is determined in terms of the inputs of the root. The following proposition describes $\text{sum}_{\log_2 n}$:

Proposition 4: Let the root have the inputs a and b. Let the size of these inputs be $n=2^{k_0}$ where $k_0$ is some integer. Then, $sumP_{log_2 n}=sumP_{k_0}$ is the following weighted sum:

$$sum\ P_{log_2 n} = \sum_{i=0}^{n-1} a[i] * b[i] z^i \quad (18)$$

The proof of this proposition proceeds from Definition 16, which provides:

$$sumP_{k_0} = \sum_{i=0}^{2^{k_0}-1} P_{k_0,i} z^{i(n/2^{k_0})} = \sum_{i=0}^{n-1} P_{k_0,i} z^i$$

From Proposition 1, it can be shown that $P_{k,i}=a^m[im]*b^m[im]$ where $m=n/2^k$. For $k=k_0$, $m=n/2^{k_0}=1$. Thus, $P_{k_0,i}=a[i]*b[i]$.

In process blocks 613-617, an iterative process is performed that results in the product of a and b. In the embodiment shown in FIG. 6, the number of iterations k performed is $log_2 n$, which is set at process block 613. At process block 614, a weighted sum $sumP_{k-1}$ is determined from $sumP_k$ (i.e., the previously calculated weighted sum). At process block 616, a determination is made whether k equals, and thus whether $sumP_0$ has been calculated. If not, then the value of k is decremented by one at process block 617 and process block 614 is repeated. If k is 1, then $sumP_0$ is assigned as the product of a and b. The relationship between the iterations can be defined by the following proposition:

Proposition 5: Let n be the input size of the root such that $2^k|n$ for some integer $k \geq 0$. Then, $sumP_{k-1}$ is related to $sumP_k$ according to the following equation:

$$sumP_{k-1} = (1+z^m)sumP_k + \sum_{i=0}^{2^{k-1}-1} s_a(i) s_b(i) mid(i) z^{(2i+1)m} \quad (19)$$

where $m=n/2^k$, $mid(i)=|a^m[2im]-a^m[(2i+1)m]|\ |b^m[(2i+1)m]-b^m[2im]|$, and $s_a(i)=sign(a^m[2im]-a^m[(2i+1)m])$ and $s_b(i)=sign(b^m[(2i+1)m]-b^m[2im])$ The proof of Proposition 19 proceeds from Definition 16, from which the following equation can be obtained:

$$sumP_{k-1} = \sum_{i=0}^{2^{k-1}-1} P_{k-1,i} z^{i(n/2^{k-1})} = \sum_{i=0}^{2^{k-1}-1} P_{k-1,i} z^{2im} \quad (20)$$

Substituting the right hand side of the Equation (14) into $P_{k-1,i}$ in the above equation gives:

$$sumP_{k-1} = \sum_{i=0}^{2^{k-1}-1} [(1+z^m)(P_{k,2i}+z^m P_{k,2i+1}) + z^m s_a s_b mid] z^{2im} \quad (21)$$

$$= (1+z^m) \sum_{i=0}^{2^{k-1}-1} (z^{2im} P_{k,2i} + z^{(2i+1)m} P_{k,2i+1}) +$$

$$\sum_{i=0}^{2^{k-1}-1} s_a s_b mid z^{(2i+1)m}$$

$$= (1+z^m) \sum_{i=0}^{2^k-1} P_{k,i} + \sum_{i=0}^{2^{k-1}-1} s_a s_b mid z^{(2i+1)m}$$

$$= (1+z^m) sumP_k + \sum_{i=0}^{2^{k-1}-1} s_a s_b mid z^{(2i+1)m}$$

Note that $s_a$, $s_b$, and mid in the proposition above are as given in Proposition 3. They are also functions of i, as described in the Equation (19).

During the computations, $sumP_k$ may need to be stored. The size of this multi-word number is given in the following proposition:

Proposition 6: Let n be the input size of the root such that $2^k|n$ for some integer $k \geq 0$. Then, the multi-word number $sumP_k$ is of $n+m$ words where $m=n/2^k$.

The proof of Proposition 6 proceeds from Definition 16, which shows that $P_{k,i}$ is weighted by powers of z. The largest power of z is $(2^k-1)n/2^k=n-m$. Thus, $sumP_k$ has at least $n-m$ words. Each power of z multiplies one of the products $P_{k,i}$. Thus, the size of $sumP_k$ is $n-m$ plus the size of $P_{k,i}$. The size of $P_{k,i}$ is $2m$ words because it is the product of the m word numbers as shown in Proposition 1. Accordingly, $sumP_k$ is $n+m$ words.

At process block 618, $sumP_0$ (the product of the operands a and b) is returned.

The embodiment described in FIG. 6 may be implemented according to the following algorithm. Because the word size n of the operands in the disclosed algorithm is a power of two, the algorithm is referred to as "KOA2$^k$" for convenience. The output t is the 2n-word product of the inputs. During the operation of the algorithm, $sumP_k$ is stored in the words of t from $t[\alpha]$ to $t[2n-1]$. Note that $sumP_k$ is $n+m$ words. Consequently, $\alpha=2n-(n+m)=n-m$. The algorithm KOA2$^k$ may be defined as follows:

```
function: KOA2^k(a, b : n-word number; n : integer)
t : 2n-word number
α, m : integer
a_M : m-word number /* max(m) = n/2 */
mid : 2m-word number
begin
    /* When the input size is one word */
Step 1:     if n = 1 then return t := a * b
    /* Initialization */
Step 2:     m := 1;   α := n - m
    /* Compute sumP_{log_2^n} */
Step 3:     (C, S) := a[0] * b[0]
Step 4:     t[α] := S
            for i = 1 to n - 1
Step 5:         (C, S) := a[i] * b[i] + C
Step 6:         t[α + i] := S
            endfor
Step 7:     t[α + n] := C
    /* Compute sumP_k */
            for k = log_2^n to 1
Step 8:         t^m[α - m] := t^m[α]
Step 9:         t^n[α] := t^n[α] + t^n[α + m]
Step 10:        c := 0;   b := 0
                for i = 0 to 2^{k-1} - 1
Step 11:            (b_a, a_M) := a^m[2im] - a^m[(2i + 1)m]
Step 12:            (b_b, b_M) := b^m[(2i + 1)m] - b^m[2im]
Step 13:            if b_a = 1 then a_M := NEG(a_M)
Step 14:            if b_b = 1 then b_M := NEG(b_M)
```

-continued

```
Step 15:          mid := KOA (a_M, b_M, m)
Step 16:          if b_a = b_b then
Step 17:              (c, t^{2m}[α + 2im]) := t^{2m}[α + 2im] + mid + c
Step 18:              (b, t^{2m}[α + 2im]) := t^{2m}[α + 2im] – b
Step 19:          if b_a ≠ b_b then
Step 20:              (b, t^{2m}[α + 2im]) := t^{2m}[α + 2im] – mid – b
Step 21:              (c, t^{2m}[α + 2im]) := t^{2m}[α + 2im] + c
              endfor
Step 22:      m := 2m;      a := n – m
          endfor
          return t
      end
```

In Step 1, n is evaluated. If n is one (i.e., if the inputs are single words), the inputs are directly multiplied and the result returned. Otherwise, the algorithm continues with the remaining steps. Step 2 initializes the variables m and α. In Steps 3 to 7, $sumP_{log_2 n}$, which equals $$\sum_{i=0}^{n-1} a[i] * b[i] z^i$$

according to Proposition 4, is computed. The result is stored in the words t[α] through t[α+n] of the output array t, where α=n−m=n−1. The product a[i]*b[i] for i=0, ..., n−1 yields a two-word result (C, S). C and S are the most and least significant words, respectively. Because this product is multiplied by $z^i$, S is added to t[α+i] and C to t[α+i+1].

In Steps 8 to 22, $sumP_{k-1}$ is obtained from $sumP_k$ iteratively. These steps are inside a loop running from k=$log_2$ n to k=1. Because m=n/$2^k$, m is multiplied by 2 in Step 22 after each iteration. In this step, it is ensured that α=n−m. At the beginning of each iteration, $sumP_k$ is available in the words of t from t[α] through t[2n−1].

The value of $sumP_{k-1}$ is computed in the manner shown in Equation (19). In Steps 8 and 9, $(1+z^m)sumP_k$ is computed and the result stored into the words from t[α−m] through t[2n−1]. This result is added to $$\sum_{i=0}^{2^{k-1}-1} s_a(i)s_b(i)mid(i)z^{(2i+1)m}$$

to obtain $sumP_{k-1}$. The steps from 10 to 21 perform this operation using two's-complement arithmetic.

In steps 11 to 15, the 2m-word mid(i) is computed and stored into mid. The value of mid(i) is defined in Proposition 5. According to this definition, two subtractions are performed in Steps 11 and 12. After the subtractions, the m-word numbers $a_M$ and $b_M$ are obtained with the borrow bits $b_a$ and $b_b$. Note that $b_a=s_a(i)$ and $b_b=s_b(i)$. Steps 13 and 14 ensure that $a_M$ and $b_M$ are equal to the magnitudes of the subtractions in Steps 11 and 12. Finally, $a_M$ and $b_M$ are multiplied in a recursive call at Step 15 to obtain mid(i).

Recall that multi-word number $(1+z^m)sumP_k$ has been computed and stored into the words of t. In Steps 16 to 21, this number is added with $s_a(i)s_b(i)mid(i) z^{(2i+1)m}$. Because these steps are in a "for loop" counting from i=0 to $2^{k-1}-1$, $$sumP_{k-1} = (1 + z^m)sumP_k + \sum_{i=0}^{2^{k-1}-1} s_a(i)s_b(i)mid(i)z^{(2i+1)m}$$

In Step 16, the borrow bits $b_a$ and $b_b$ are evaluated. If $b_a=b_b$, $s_a(i)s_b(i)mid(i)=mid(i)$, the value of mid(i) $z^{(2i+1)m}$ is added to $(1+z^m)sumP_k$. This operation is accomplished in Step 17. In this step, mid(i) is contained in mid, and $(1+z^m)sumP_k$ is contained in the words from t[α−m] to t[2n−1]. Because mid(i) is 2m words and multiplied by $z^{(2i+1)m}$, mid is added to the 2m-word subarray $t^{2m}[α−m+(2i+1)m]=t^{2m}[α+2im]$.

If $b_a≠b_b$, $s_a(i)s_b(i)mid(i)=-mid(i)$, and the value of mid is subtracted instead of added, as seen in Step 20. These additions and subtractions yield the borrow bit b and the carry bit c. These bits should be propagated in both cases. In Step 10, these bits are set to zero.

After these iterations have been performed, $sumP_0$ is obtained in the 0th to (2n−1)th words of t. As noted above, $sumP_0$ is the final result of the algorithm and constitutes the product of a*b.

Complexity of $KOA2^k$

In this section, the complexity of the exemplary $KOA2^k$ algorithm described in the previous section is analyzed. In the complexity analysis, the cost of the carry and borrow bit manipulations are ignored, as they were in the previous complexity analysis.

Table 3 gives the numbers of word operations, word reads and word writes needed for input lengths n>1. Specifically, the first, second, and third columns give the number of word operations, memory reads, and memory writes, respectively. In Steps 3 to 7, the

TABLE 3

The complexity of a call to $KOA2^k$ with an input length n > 1.

| Step No | operation | read | write |
|---|---|---|---|
| 3, 4, 5, 6, 7 | | nT(1) + 2n − 2 | |
| 8 | | n − 1 | n − 1 |
| 9 | $nlog_2 n$ | $2nlog_2 n$ | $nlog_2 n$ |
| 11 | $\frac{n}{2} log_2 n$ | $nlog_2 n$ | $\frac{n}{2} log_2 n$ |
| 12 | $\frac{n}{2} log_2 n$ | $nlog_2 n$ | $\frac{n}{2} log_2 n$ |
| 13, 14 | $\frac{n}{2} log_2 n$ | $\frac{n}{2} log_2 n$ | $\frac{n}{2} log_2 n$ |
| 15 | | recursions | |
| 17, 20 | $nlog_2 n$ | $2nlog_2 n$ | $nlog_2 n$ |
| 18, 21 | $nlog_2 n$ | $nlog_2 n$ | $nlog_2 n$ |
| Total | | $nT(1) + 16.5 nlog_2 n + 4n − 4$ | | words of a and b are read, multiplied, and stored into the words of t. The cost of these operations are included in T(1), and there are n multiplications in these steps. Thus, the total cost is nT(1) due to the multiplications. Also, the addition in Step 5 must be taken into account. This is a two-word addition operation in a loop iterating n−1 times. Thus, it costs a total of (2n−2) word operations. It is assumed that C and S in the steps from 3 to 7 are register variables. Thus, the cost of accessing them is not taken into account.

In Step 8, there exists a ($m=n/2^k$)-word assignment in a loop iterating $\log_2 n$ times. This results in a total of $$\sum_{k=1}^{\log_2 n} n/2^k = n-1$$

word assignments. In Step 9, the addition of the n word numbers occurs in the same loop. Thus, Step 9 costs a total of $n \log_2 n$ word additions.

Steps 11 to 21 are performed in two loops. The first loop iterates $\log_2 n$ times, and the second loop iterates $2^{k-1}$ times. Steps 11 to 14 perform operations on m-word numbers. Thus, ($m2^{k-1} \log_2 n$)=($n/2$) $\log_2 n$ word operations are needed to perform each of these steps. On the other hand, Steps 17 to 21 perform operations on 2m-word numbers. Thus, ($2m2^{k-1} \log_2 n$)=$n \log_2 n$ word operations are needed to perform each of these steps.

According to the previous paragraph, Table 3 gives the number of the word operations as ($n/2$) $\log_2 n$ for Steps 11 to 14. However, the situation is different for Steps 13 and 14. The m-word negation operations in these steps are conditionally executed, and it is assumed that their execution probability is ½. Thus, their total complexity equals the complexity of one m-word negation on average, as shown in Table 3.

As seen in Table 3, a single value for the complexity of Steps 17 and 20 is computed. Similarly, a single value is used for Steps 18 and 21. This is because either Steps 17 and 18 or Steps 20 and 21 are executed, depending on the condition $b_a=b_b$. In Steps 17 and 20, there exists two word reads and one memory write for each word operation. In Steps 18 and 21, there exists one word read and one memory write for each word operation. As noted above, performing each of the Steps 17 through 21 takes $n \log_2 n$ word operations.

The recursion occurs in Step 15. The recursive call in this step has ($m=n/2^k$)-word inputs and is in two "for" loops. As shown below, the complexity T(n) satisfies the recurrence:

$$T(n) = \sum_{k=1}^{\log_2 n} 2^{k-1} T(n/2^k) + \text{Total}(n) \tag{22}$$

where Total(n) is the total number operations, reads, and writes given in Table 3 (i.e., $nT(1)+16.5n \log_2 n+4n-4$). This recursion equation may be simplified as follows:

$$T(n/2) = \sum_{k=1}^{\log_2(n/2)} 2^{k-1} T(n/2/2^k) + \text{Total}(n/2) \tag{23}$$

$$= (1/2) \sum_{k=1}^{\log_2 n - 1} 2^k T(n/2^{k+1}) + \text{Total}(n/2)$$

$$= (1/2) \sum_{k=2}^{\log_2 n} 2^{k-1} T(n/2^k) + \text{Total}(n/2)$$

Next, consider the following subtraction:

$$T(n) - 2T(n/2) = \sum_{k=1}^{\log_2 n} 2^{k-1} T(n/2^k) + \text{Total}(n) - \tag{24}$$

$$\sum_{k=2}^{\log_2 n} 2^{k-1} T(n/2^k) - 2\text{Total}(n/2)$$

After cancellations:

$$T(n) - 2T(n/2) = \sum_{k=1}^{1} 2^{k-1} T(n/2^k) + \text{Total}(n) - 2\text{Total}(n/2) \tag{25}$$

$$= T(n/2) + \text{Total}(n) + 2\text{Total}(n/2)$$

Therefore, the following recurrence for the algorithm KOA2$^k$ can be obtained:

$$T(n) = 3T(n/2) + \text{Total}(n) - 2\text{Total}(n/2) \tag{26}$$

$$= 3T(n/2) + 16.5n + 4$$

The recurrence relation above is similar to the recurrence relation of the KOA. Recall that the recurrence relation for the KOAcomp function described above is:

$$T(n)=3T(n/2)+19n$$

The solution for the recurrence relation is given in Equation (11). The complexity T(n) is $O(n^{1.58})$ in this solution. Equation (26) can be solved in the same fashion to find the complexity of the KOA2$^k$, which is again $O(n^{1.58})$. However, because $16.5n+4<19n$ for $n>1$, the KOA2$^k$ is less complex than the KOA.

Recursivity of KOA2$^k$

Let r(n) be the number of the recursive calls needed to multiply the n-word numbers by the KOA2$^k$. The KOA2$^k$ makes $2^{k-1}$ recursive calls with the ($m=n/2^k$)-word inputs in a loop iterating from k=1 to $\log_2 n$. The following recurrence therefore results:

$$r(n) = \sum_{k=1}^{\log_2 n} 2^{k-1} + \sum_{k=1}^{\log_2 n} 2^{k-1} r(n/2^k) \tag{27}$$

$$= n - 1 + \sum_{k=2}^{\log_2 n} 2^{k-1} r(n/2^k)$$

This recursion equation may be simplified as follows:

$$r(n/2) = n/2 - 1 + \sum_{k=1}^{\log_2(n/2)} 2^{k-1} r(n/2/2^k) \tag{28}$$

$$= n/2 - 1 + (1/2) \sum_{k=1}^{\log_2 n - 1} 2^k r(n/2^{k+1})$$

-continued $$= n/2 - 1 + (1/2) \sum_{k=2}^{\log_2 n} 2^{k-1} r(n/2^k)$$

Next, consider the following subtraction:

$$r(n) - 2r(n/2) = \qquad (29)$$

$$n - 1 + \sum_{k=1}^{\log_2 n} 2^{k-1} r(n/2^k) - \left( n - 2 + \sum_{k=2}^{\log_2 n} 2^{k-1} r(n/2^k) \right)$$

After cancellations:

$$r(n) - 2r(n/2) = 1 + \sum_{k=1}^{1} 2^{k-1} r(n/2^k) \qquad (30)$$

$$= 1 + 3r(n/2)$$

The following recurrence is eventually obtained:

$$r(n) = 1 + 3r(n/2) \qquad (31)$$

$$= 1 + 3 + \ldots + 3^{k-1} + 3^k r(1)$$

$$= 1 + 3 + \ldots + 3^{k-1} = (3^k - 1)/2$$

In Equation (12), it was found that the recursivity of the KOA was $3(3^k-1)/2$. Therefore, the KOA2$^k$ algorithm is three times less recursive than the KOA.

An Example of Multiplication Using KOA2$^k$

The operation of the algorithm KOA2$^k$ is illustrated in the following example and FIGS. 7 through 11. FIGS. 7 through 11 illustrate the operation of the KOA2$^k$ algorithm by relating it to the recursion tree of FIG. 1. In this example, two numbers "F3D1" and "6CA3" are multiplied together. Both numbers comprise four hexadecimal values, which can be associated with four 4-bit words. Thus, the operand size is n=4, and the word size is w=4. Note that the operand size is a power of two. Let a denote F3D1 and a[i] denote the ith digit of F3D1. Also, let b denote 6CA3 and b[i] denote the ith digit of 6CA3.

The First Weighted Sum

In Steps 3 to 7, sumP$_{\log_2 n}$=sumP$_2$ is computed. As stated in Proposition 4, sumP$_{\log_2 n}$ is equal to $$\sum_{i=0}^{n-1} a[i] * b[i] z^i.$$

Thus, $$a[0]*b[0]=1*3=03 \quad a[1]*b[1]=D*A=82$$

$$a[2]*b[2]=3*C=24 \quad a[3]*b[3]=F*6=5A$$

Multiplication by $z=2^w$ is equivalent to a 1-word shift. Thus, sumP$_2$ is found as follows:

$$\begin{array}{r} 03 \\ 82 \\ 24 \\ + \quad 5A \\ \hline sumP_2 = 5CC23 \end{array}$$

Figure 7:
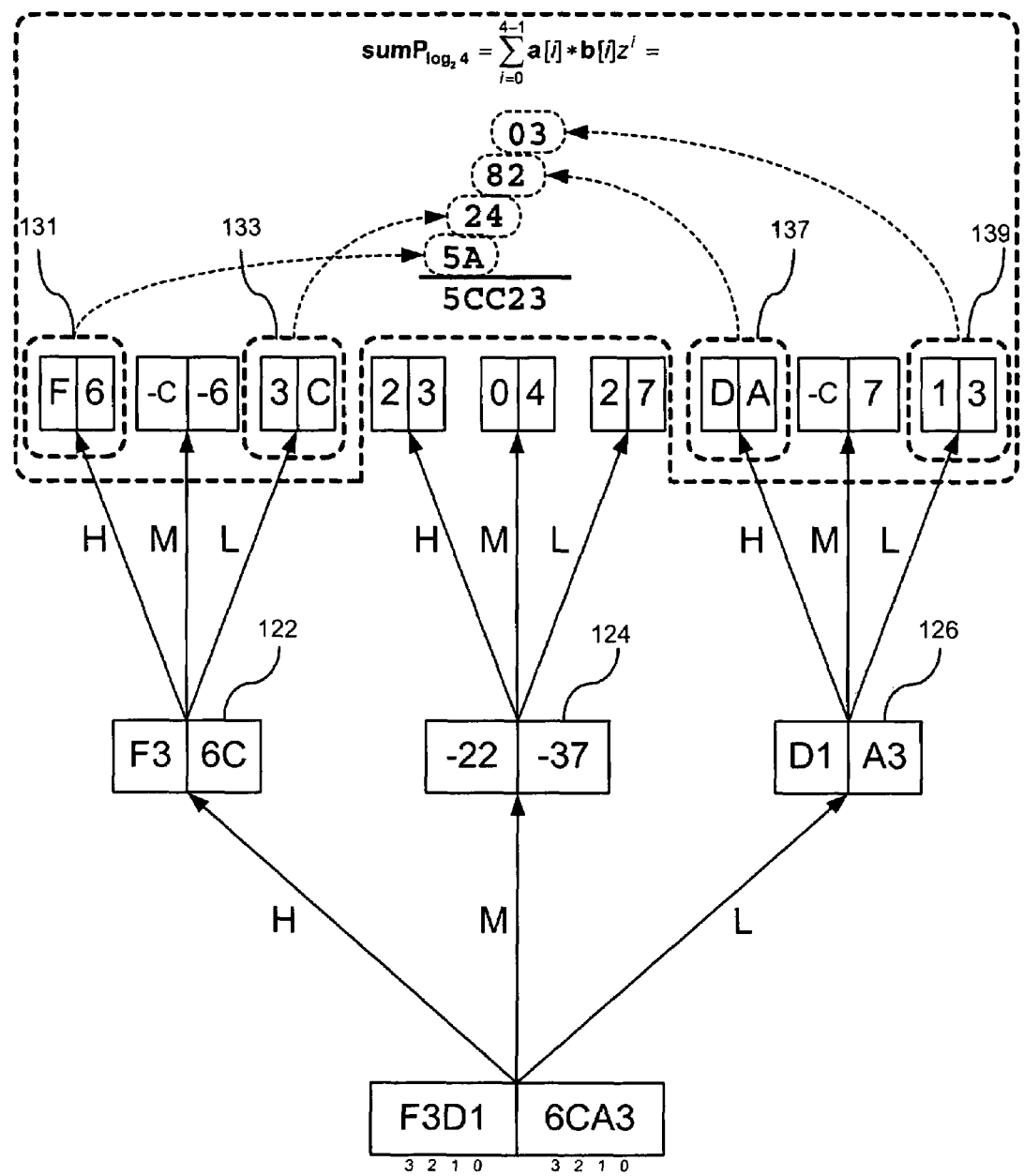
FIG. 7 is a first block diagram illustrating the operation of the method of FIG. 6 using the recursion tree of FIG. 1.

FIG. 7 illustrates these steps in terms of the corresponding recursion tree. As seen in FIG. 7, the four products that are added in the weighted sum sumP$_2$ correspond to branches 131, 133, 137, 139. Branches 131, 133, 137, 139 are leaves of the recursion tree and belong to the special set described above consisting of low or high branches with no mid-branch ancestors. Moreover, the amount of shifting performed on each subproduct before obtaining the weighted sum is related to the positions of the multiplied words relative to the radix.

The Iterative Steps

Steps 8 to 22 are inside a "for loop". This loop implements the iteration in Equation (19). In the first iteration of the loop, sumP$_1$ is computed from sumP$_2$. In the second iteration, sumP$_0$ is computed from sumP$_1$.

Steps 8 and 9 (1st Iteration)

In Steps 8 and 9, the term $(1+z^m)$sumP$_k$ in Equation (19) is computed. In the first iteration, k=$\log_2 n$=2 and m=n/2$^k$=1. The term $(1+z)$sumP$_2$ is obtained by shifting and adding sumP$_2$ with itself.

$$\begin{array}{r} 5CC23 \\ + \quad 5CC230 \\ \hline 628E53 \end{array}$$

Steps 11 to 15 (1st Iteration)

In Steps 11 to 15, the terms $s_a(i)s_b(i)mid(i)$ $z^{(2i+1)m}$ in Equation (19) for i=0, ..., $2^{k-1}$-1 are computed.

$$s_a(0)s_b(0)mid(0)z^m = (a[0] - a[1])(b[1] - b[0])z^m$$

$$= (1 - D)(A - 3)z^m = -54 z^m = -540$$

$$s_a(1)s_b(1)mid(1)z^{3m} = (a[0] - a[1])(b[1] - b[0])z^{3m}$$

$$= (3 - F)(6 - C)z^{3m} = 48 z^{3m} = 48000$$

Steps 16 to 21 (1st Iteration)

Once every term in iteration relation (19) has been computed, the weighted sum sumP$_1$ can be obtained by adding the terms as follows:

$$\begin{array}{r} 628E53 \\ -540 \\ +48000 \\ \hline sumP_1 = 670913 \end{array}$$

Figure 8:
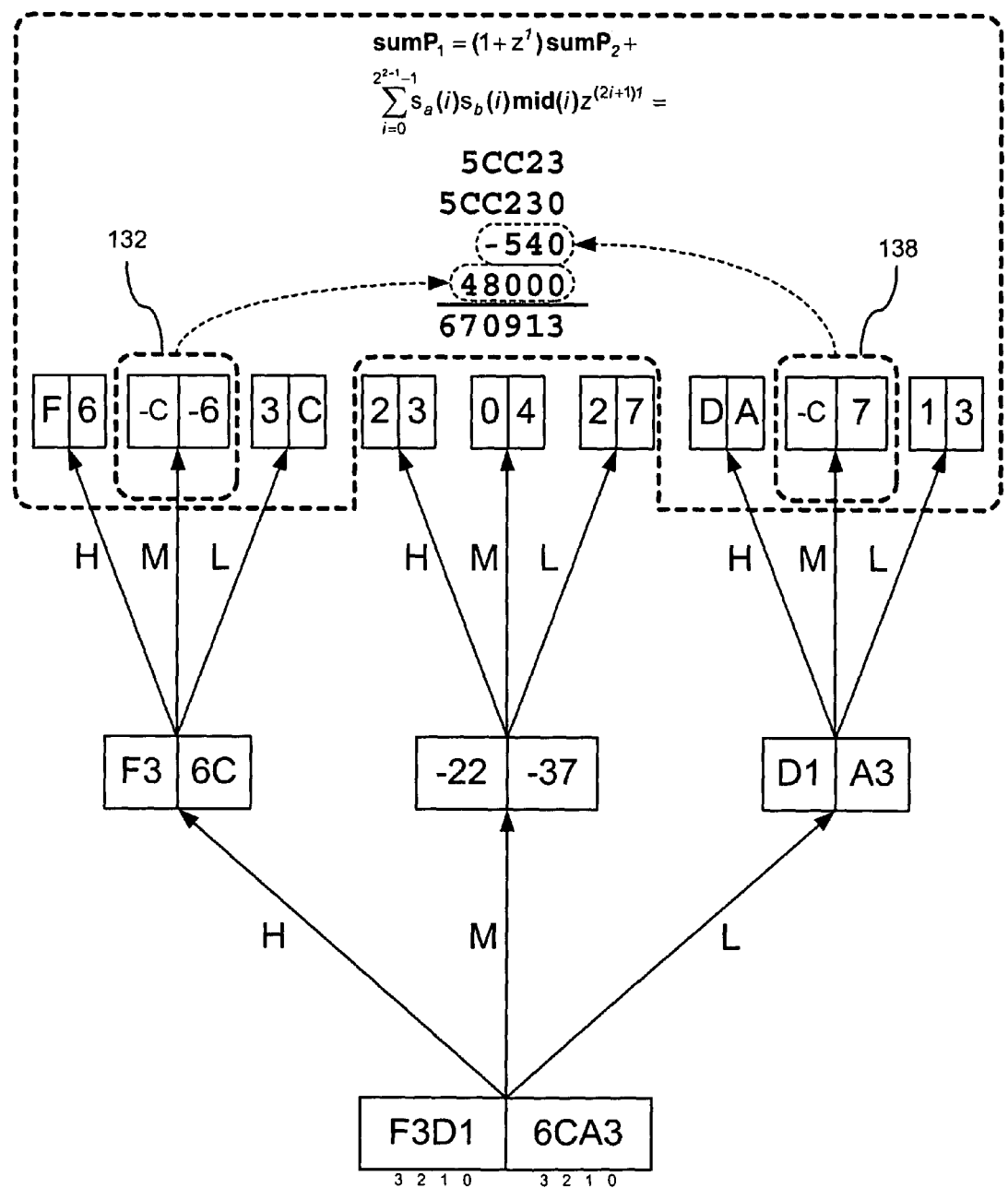
FIG. 8 is a second block diagram illustrating the operation of the method of FIG. 6 using the recursion tree of FIG. 1.

FIG. 8 illustrates these steps in terms of the equivalent recursion tree. As seen in FIG. 8, the two additional subproducts that are added in the weighted sum $sumP_1$ correspond to branches 132, 138. Moreover, branches 132, 138 correspond to the mid-branch children from the high branch 122 and the low branch 126. The amount of shifting performed on each subproduct 132, 138 is related to the position of the subproducts within the recursion tree.

Steps 8 and 9 (2nd Iteration)

In the second iteration, $k=\log_2 n=1$ and $m=n/2^k=2$. Thus, $(1+z^m)sumP_k=(1+z^2)sumP_1$ is computed. For this, $sumP_1$ is shifted and added to itself as shown below.

$$\begin{array}{r} 670913 \\ +\ 67091300 \\ \hline 67701C13 \end{array}$$

Steps 11 to 15 (2nd Iteration)

For $k=1$ and $m=2$, $s_a(i)s_b(i)mid(i)\ z^{(2i+1)m}$ is computed for $i=0, \ldots, 2^{k-1}-1$.

$$s_a(0)s_b(0)mid(0)z^m = (a^2[0] - a^2[2])(b^2[2] - b^2[0])z^{2m}$$
$$= (D1 - F3)(6C - A3)z^{2m}(-22)(-33)z^{2m}$$
$$= 74Ez^{2m} = 74E00$$

Figure 9:
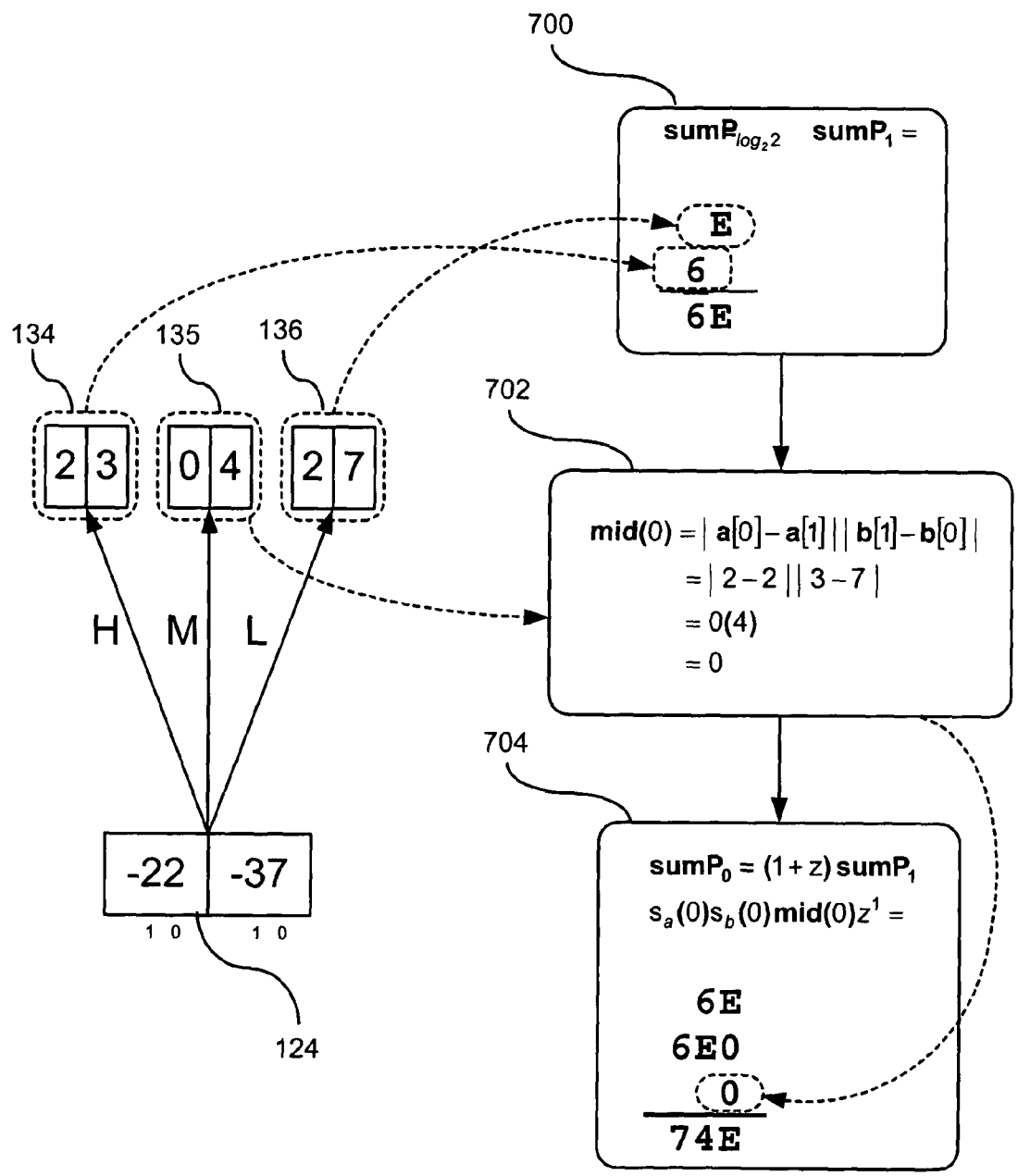
FIG. 9 is a third block diagram illustrating the operation of the method of FIG. 6 using the recursion tree of FIG. 1.

To compute the product of $(-22)(-37)$, Step 15 includes a recursive call to the $KOA2^k$ algorithm. The details of this recursive call are omitted from the above equation, but are shown in FIG. 9. In particular, FIG. 9 shows that $s^a(0)s_b(0) mid(0)z^m$ corresponds to branch 124 from the equivalent recursion tree in FIG. 1. Thus, to determine the product of $(-22)(-37)$, the $KOA2^k$ is performed with $a=22$ and $b=37$, where $s_a(0)$ and $s_b(0)$ ensure the proper sign of the result. In process block 700, the weighted sum $sumP_1$ is calculated using the products from branches 134, 136. Then, in order to calculate the next weighted sum $sumP_0$, the value of $mid(0)$ is determined at process block 702. As seen from process block 702, the value of $mid(0)$ in this case is zero. At process block 704, the weighted sum $sumP_0$ is determined according to Equation (19). The result of the weighted sum is "74E," which is returned for use in Steps 16 to 21 of the earlier iteration.

Steps 16 to 21 (2nd Iteration)

At this point, every term in the iteration relation (19) has been computed for $k=1$ and $m=2$. Adding these terms, $sumP_0$ is obtained as follows:

$$\begin{array}{r} 67701C13 \\ +\ \ \ \ \ \ \ 74E00 \\ \hline sumP_0 = 67776A13 \end{array}$$

$sumP_0$ is the result of the multiplication.

Figure 10:
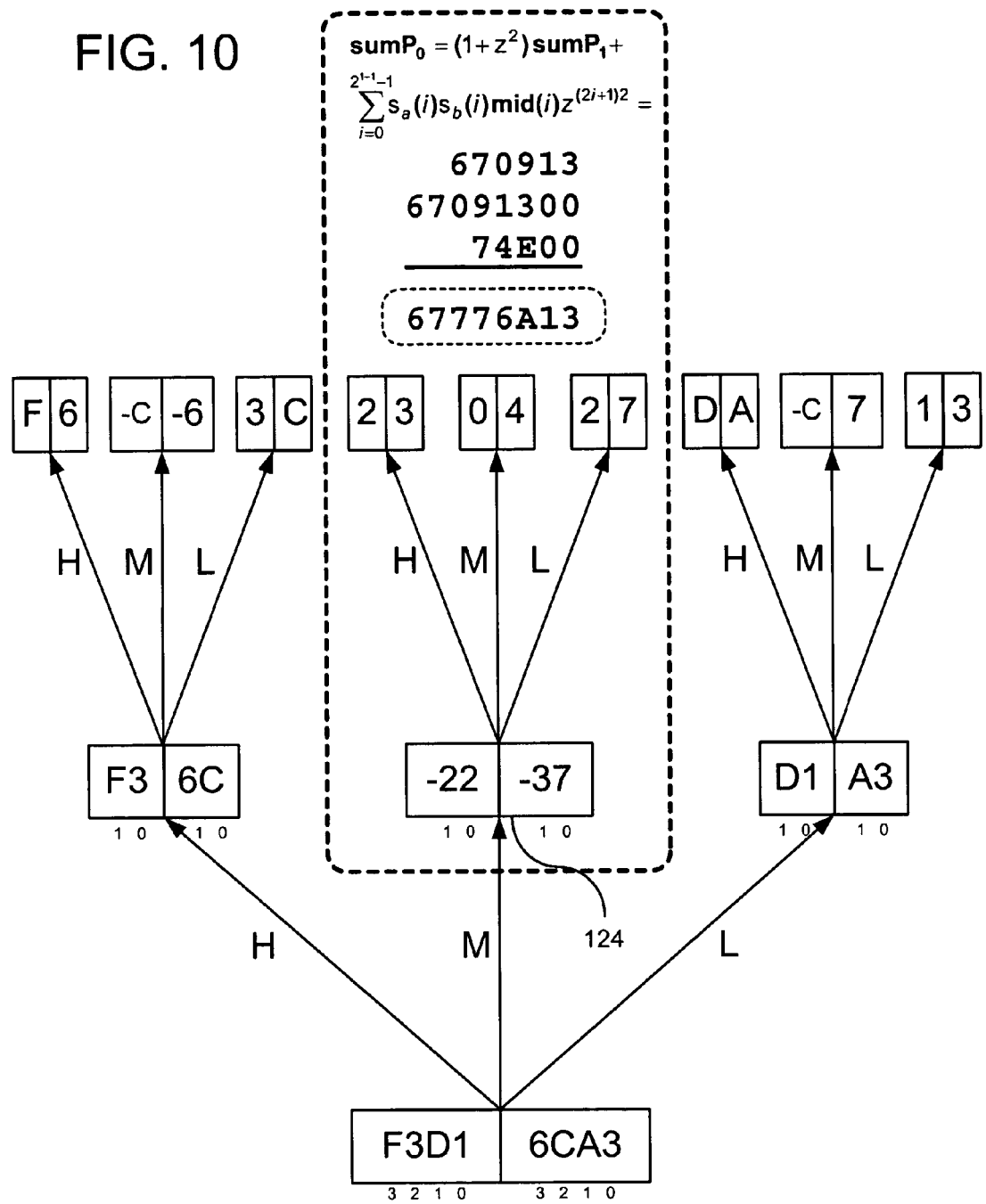
FIG. 10 is a fourth block diagram illustrating the operation of the method of FIG. 6 using the recursion tree of FIG. 1.

FIG. 10 illustrates the computation of the weighted sum $sumP_0$ and the result "67776A13." Note that the final result is the same as the one shown in FIG. 2 illustrating the KOA.

Applications of $KOA2^k$

The methods described above may be used in a variety of different applications wherein multiplication of multi-precision numbers is performed. For example, the methods may be used in a software program that performs arbitrary-precision arithmetic (e.g., Mathematica) or in other specialized or general-purpose software implementations. Additionally, the methods may be used in the field of cryptography, which often involves the manipulation of large multi-precision numbers. For example, the methods may be used to at least partially perform the calculation of a variety of different cryptographic parameters. These cryptographic parameters may include, for instance, a public key, a private key, a ciphertext, a plaintext, a digital signature, or a combination of these parameters. Cryptographic systems that may benefit from the disclosed methods and apparatus include, but are not limited to, systems using the RSA algorithm, the Diffie-Hellman key exchange algorithm, the Digital Signature Standard (DSS), elliptic curves, the Elliptic Curve Digital Signature Algorithm (ECDSA), or other algorithms. In one particular implementation, the methods are used, at least in part, to generate and verify a key pair or to generate and verify a signature according to the ECDSA. For example, the methods may be used to compute $Q=dG$ during the key-pair generation process, wherein Q is a public key, d is a private key, and G is a base point. Moreover, the methods may be used to verify that $nQ=O$ during the key pair verification process, wherein n is the order of the point G, and O is the point at infinity of the elliptic curve. Similarly, the methods may be used to compute $kG=(x_1, y_1)$, wherein k is a random or pseudorandom integer and $(x_1, y_1)$ are points on an elliptic curve. The methods may similarly be used to calculate the related modular, inverse modular, and hash functions during the signature generation and verification processes.

Figure 11:
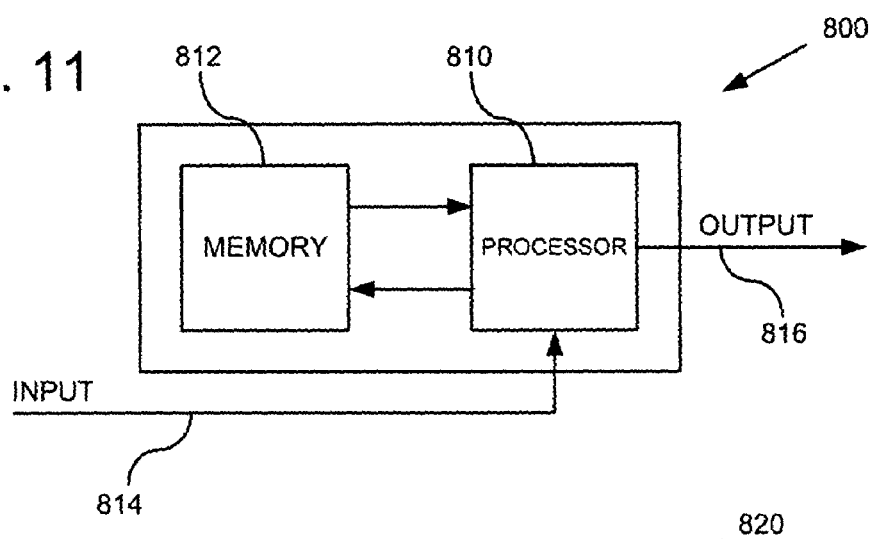
FIG. 11 is a block diagram of a general-purpose computer configured to perform multi-precision multiplication according to the disclosed methods.

Any of the methods described above may be implemented in a number of different hardware and/or software environments. FIG. 11 shows a block diagram of one exemplary general hardware implementation. More particularly, FIG. 11 shows a multiplying apparatus 800 (e.g., a computer) that includes a processor 810 (e.g., a microprocessor), memory 812 (e.g., RAM or ROM) and an input data path 814. The multiplication algorithm may be stored in the memory or on a computer-readable medium (e.g., hard disk, CD-ROM, DVD, floppy disk, RAM, ROM) that is separate from the memory 812 and that is accessed by the processor 810 before or during execution of the algorithm. During operation, the input operands may be supplied via the input data path 814 or by the memory 812. The processor 810 and the memory 812 are coupled together via the data paths 816, which enable the various read and write operations performed during the algorithm. The final product computed by the processor 810 may be output from the processor on output data path 816 or stored in the memory 812 for later use. The details of this general hardware implementation are omitted.

Figure 12:
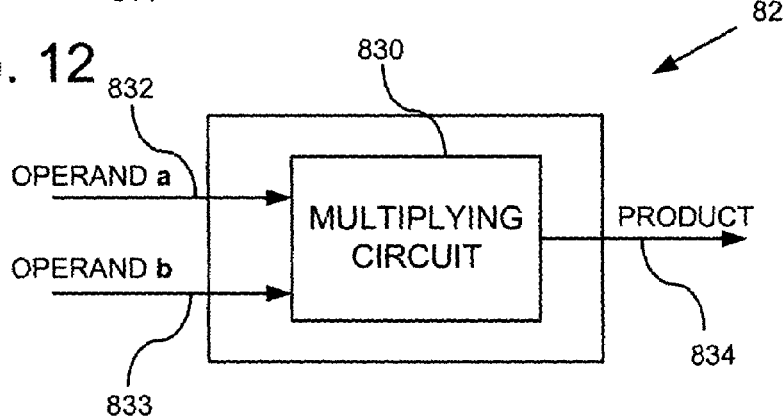
FIG. 12 is a block diagram of a dedicated digital circuit configured to perform multi-precision multiplication according to the disclosed methods.

The disclosed methods may also be implemented in dedicated digital circuits configured to perform multi-precision multiplication. For instance, FIG. 12 shows a circuit 820 that includes a multiplying circuit 830 (e.g., combinational logic and sequential memory elements) configured to perform the multi-precision multiplication. Two inputs 832, 833 may be used to input the operands a and b. Alternatively, the operands may be input sequentially via a single input, or in parallel via multiple input paths. The circuit 820 may be clocked to load the operands and to perform the multiplication operation. The result of the multiplication may be output on data path 834. The circuit 820 may be, for instance, a printed circuit board (PCB), a smart card, a field programmable gate array (FPGA), a field programmable system level integrated circuit (FPSLIC), an integrated circuit used in a System on Chip environment (SOC), or any other type of integrated circuit suited for implementing the algorithms described above.

Figure 13:
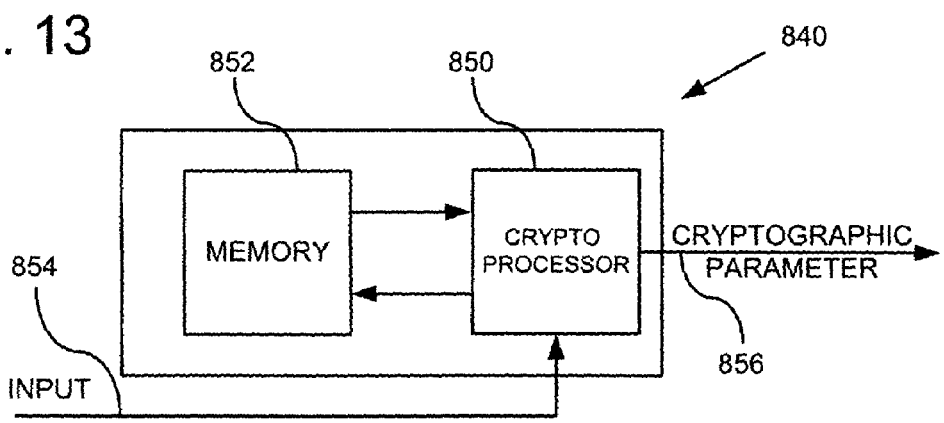
FIG. 13 is a block diagram of a cryptographic system configured to perform multi-precision multiplication according to the disclosed methods and to output a cryptographic parameter.

As noted, the disclosed methods may be used in cryptography to help compute a variety of cryptographic parameters using multi-precision multiplication. FIG. 13 shows a block diagram of general cryptographic apparatus 840 that may be used to multiply two operands to produce a cryptographic parameter. The apparatus 840 includes a cryptographic processor 850 used to perform the algorithm; memory 852 used to store the operands, the intermediate results, and computer-executable instructions for performing the algorithm; and an input data path 854. The apparatus 840 operates much like the apparatus described in FIG. 11, but produces a cryptographic parameter at its output 856. The cryptographic parameter may be related to or constitute a portion of a public key, private key, ciphertext, plaintext, digital signature, or some combination thereof. The parameter may also constitute a number of other values used in cryptography. The cryptographic apparatus 840 may be included in a variety of security applications. For instance, the apparatus 840 may be included in a secure transaction server used for financial transactions, confidential record storage, SmartCards, and cell phones. The dedicated circuit shown in FIG. 12 may similarly be implemented as part of a dedicated cryptographic system.

In view of the many possible implementations, it will be recognized that the illustrated embodiments include only examples and should not be taken as a limitation on the scope of the disclosed technology. Instead, the invention is intended to encompass all alternatives, modifications, and equivalents as may be included within the spirit and scope of the technology defined by the following claims.

What is claimed is:

1. A method of generating a cryptographic key pair, comprising:
    receiving a private key;
    receiving a base point, the private key and the base point comprising multi-precision numbers having n words, where n is an integer that is a power of two and is greater than one; and
    multiplying the private key by the base point to obtain a multi-precision number associated with a public key, the multiplying comprising:
        storing the base point as a first array of n words, and storing the private key as a second array of n words;
        determining a first weighted sum from multiple subproducts of corresponding words of the first array and the second array;
        iteratively determining a next weighted sum from a previous weighted sum, a shifted version of the previous weighted sum, and a recursively calculated intermediate product; and
        storing the next weighted sum on a computer-readable medium.

2. A digital signature process, comprising:
    receiving a first cryptographic parameter and a second cryptographic parameter, each cryptographic parameter being a multi-precision number having n words, where n is an integer that is a power of two and is greater than one; and
    multiplying the first cryptographic parameter by the second cryptographic parameter, the multiplying comprising:
        storing the first cryptographic parameter as a first array of n words, and storing the second cryptographic parameter as a second array of n words;
        determining a first weighted sum from multiple subproducts of corresponding words of the first cryptographic parameter and the second cryptographic parameter;
        iteratively determining a next weighted sum from a previous weighted sum, a shifted version of the previous weighted sum, and a recursively calculated intermediate product; and
        storing the next weighted sum on a computer-readable medium.

3. The method of claim 2, wherein the digital signature process is signature generation or signature verification associated with an elliptic curve digital signature.

4. An integrated circuit having combinational logic and memory elements configured to perform a cryptographic method, the cryptographic method comprising:
    receiving a first operand and a second operand;
    storing the first operand as a first array of n words, and storing the second operand as a second array of n words, wherein n is an integer that is a power of two and is greater than one;
    determining a first weighted sum from multiple subproducts of corresponding words of the first operand and the second operand;
    iteratively determining a next weighted sum from a previous weighted sum, a shifted version of the previous weighted sum, and a recursively calculated intermediate product; and
    outputting a cryptographic parameter calculated at least in part from the next weighted sum.

5. The integrated circuit of claim 4, wherein the integrated circuit is a field programmable gate array.

6. A computer-readable medium, comprising computer-executable instructions which when executed will cause a computer to perform a cryptographic method, the cryptographic method comprising:
    receiving a first operand and a second operand;
    storing the first operand as a first array of n words, and storing the second operand as a second array of n words, wherein n is an integer that is a power of two and is greater than one;
    determining a first weighted sum from multiple subproducts of corresponding words of the first operand and the second operand;
    iteratively determining a next weighted sum from a previous weighted sum, a shifted version of the previous weighted sum, and a recursively calculated intermediate product; and
    outputting a cryptographic parameter calculated at least in part from the next weighted sum.

7. A cryptographic method comprising:
    storing a first operand and a second operand as n words on a computer-readable medium, wherein n is an integer that is a power of two;
    determining multiple subproducts by multiplying words of the first operand with words of the second operand, wherein the multiplied words have the same respective positions within the respective operands;
    shifting the multiple subproducts by an amount corresponding to the respective positions of the multiplied words within the respective operands;
    adding the shifted subproducts to obtain a weighted sum; and
    outputting a cryptographic parameter calculated at least in part using the weighted sum.

8. The method of claim 7, wherein n is an integer greater than one, the method further comprising performing at least one iterative computation in which the weighted sum is an addend.

9. The method of claim 8, wherein a number of iterative computations performed is $\log_2 n$.

27

10. The method of claim 7, wherein n is an integer greater than one, and wherein the weighted sum is a first weighted sum, the method further comprising calculating a second weighted sum in which the first weighted sum is an addend.

11. A method of generating a cryptographic key pair, comprising:
  receiving a private key;
  receiving a base point, the private key and the base point comprising multi-precision numbers having n words, where n is an integer that is a power of two; and
  multiplying the private key by the base point to obtain a multi-precision number associated with a public key, the multiplying comprising:
    storing the base point and the private key as n words on a computer-readable medium;
    determining multiple subproducts by multiplying words of the base point with words of the private key, wherein the multiplied words have the same respective positions within the base point and the private key;
    shifting the multiple subproducts by an amount corresponding to the respective positions of the multiplied words within the base point and the private key;
    adding the shifted subproducts to obtain a weighted sum; and
    storing the weighted sum on the computer-readable medium.

12. A signature generation or signature verification process, comprising:
  receiving a first cryptographic parameter and a second cryptographic parameter, each cryptographic parameter being a multi-precision number having n words, where n is an integer that is a power of two; and
  multiplying the first cryptographic parameter by the second cryptographic parameter, the multiplying comprising:
    storing the first cryptographic parameter and the second cryptographic parameter as n words on a computer-readable medium;
    determining multiple subproducts by multiplying words of the first cryptographic parameter with words of the second cryptographic parameter, wherein the multiplied words have the same respective positions within the respective cryptographic parameters;
    shifting the multiple subproducts by an amount corresponding to the respective positions of the multiplied words within the respective cryptographic parameters;
    adding the shifted subproducts to obtain a weighted sum; and
    storing the weighted sum on the computer-readable medium.

13. The method of claim 12, wherein the signature generation or signature verification is associated with an elliptic curve digital signature.

14. An integrated circuit having combinational logic and memory elements configured to perform a cryptographic method, the cryptographic method comprising:
  storing a first operand and a second operand as n words on a computer-readable medium, wherein n is an integer that is a power of two;
  determining multiple subproducts by multiplying words of the first operand with words of the second operand, wherein the multiplied words have the same respective positions within the respective operands;

28 shifting the multiple subproducts by an amount corresponding to the respective positions of the multiplied words within the respective operands;
  adding the shifted subproducts to obtain a weighted sum; and
  outputting a cryptographic parameter calculated at least in part using the weighted sum.

15. The integrated circuit of claim 14, wherein the integrated circuit is a field programmable gate array.

16. A computer-readable medium, comprising computer-executable instructions which when executed will cause a computer to perform a cryptographic method, the cryptographic method comprising:
  storing a first operand and a second operand as n words on a computer-readable medium, wherein n is an integer that is a power of two;
  determining multiple subproducts by multiplying words of the first operand with words of the second operand, wherein the multiplied words have the same respective positions within the respective operands;
  shifting the multiple subproducts by an amount corresponding to the respective positions of the multiplied words within the respective operands;
  adding the shifted subproducts to obtain a weighted sum; and
  outputting a cryptographic parameter calculated at least in part using the weighted sum.

17. A cryptographic method, comprising:
  obtaining a first operand a and a second operand b;
  storing the operands a and b as n words, n being an integer that is a power of two and that is greater than 1, wherein the operands a and b can be written in radix z as $$a = \sum_{i=0}^{n-1} a[i]z^i \text{ and } b = \sum_{i=0}^{n-1} b[i]z^i,$$

where i is an index integer and a[i] indicates the ith word in the operand a and b[i] indicates the ith word in the operand b;
  computing $sumP_{log_2 n}$, wherein $sumP_{log_2 n}$ is equal to $$\sum_{i=0}^{n-1} a[i] * b[i]z^i;$$

storing $sumP_{log_2 n}$;
  iteratively computing $sumP_{k-1}$ from $sumP_k$ for $k=log_2 n$ to $k=1$, wherein:

$$sumP_{k-1} = (1 + z^m) sumP_k + \sum_{i=0}^{2^{k-1}-1} s_a(i)s_b(i)mid(i)z^{(2i+1)m},$$

wherein $m=n/2^k$, and $mid(i)=|a^m[2im]-a^m[(2i+1)m]||b^m[(2i+1)m]-b^m[2im]|$ $s_a(i)=sign(a^m[2im]-a^m[(2i+1)m])$, and $s_b(i)=sign(b^m[(2i+1)m]-b^m[2im])$; and outputting a cryptographic parameter calculated at least in part using $sumP_{k-1}$.

18. The method of claim 17, further comprising returning $sumP_0$.

19. The method of claim 17, wherein a number of iterations is $\log_2 n$.

20. A method of generating a cryptographic key pair, comprising:
receiving a private key;
receiving a base point, the private key and the base point comprising multi-precision numbers having n words, where n is an integer that is a power of two; and
multiplying the private key by the base point to obtain a multi-precision number associated with a public key, the multiplying being performed according to the method of claim 17.

21. A signature generation or signature verification process, comprising:
receiving a first cryptographic parameter and a second cryptographic parameter, each cryptographic parameter being a multi-precision number having n words, where n is an integer that is a power of two; and
multiplying the first cryptographic parameter by the second cryptographic parameter using the method of claim 17.

22. The method of claim 21, wherein the signature generation or signature verification is associated with an elliptic curve digital signature.

23. A field programmable gate array configured to perform the method of claim 17.

24. An integrated circuit having combinational logic and memory elements configured to perform the method of claim 17.

25. A computer-readable medium, comprising instructions for performing the method of claim 17.

26. A cryptographic method, comprising:
receiving a first operand and a second operand;
storing the first operand as a first array of n words, and storing the second operand as a second array of n words, wherein n is an integer that is a power of two;
determining multiple subproducts by multiplying words of the first operand with corresponding words of the second operand, wherein at least two of the subproducts correspond to independent branches of a corresponding recursion tree, wherein the corresponding words of the second operand have a same position relative to a radix point as the words of the first operand;
combining the subproducts into a weighted sum, wherein the subproducts included in the weighted sum are multiplied by a power of a related radix and the power is determined by the position of the multiplied words within respective operands; and
outputting a cryptographic parameter based at least in part on the weighted sum.

27. The method of claim 26, wherein the independent branches are low or high branches that have no mid-branch ancestors from the equivalent recursion tree.

28. The method of claim 26, wherein n is an integer greater than one, and wherein the weighted sum further includes a recursively calculated mid branch from the equivalent recursion tree.

29. A field programmable gate array configured to perform the method of claim 26.

30. An integrated circuit having combinational logic and memory elements configured to perform the method of claim 26.

31. A computer-readable medium, comprising instructions for performing the method of claim 26.

32. A cryptographic method, comprising:
receiving a first operand and a second operand;
storing the first operand and the second operand as a first and a second array, respectively, of n words, wherein n is an integer that is a power of two and is greater than one;
determining a first weighted sum from multiple subproducts of corresponding words of the first operand and the second operand;
iteratively determining a next weighted sum from a previous weighted sum, a shifted version of the previous weighted sum, and a recursively calculated intermediate product; and
outputting a cryptographic parameter.

33. The method of claim 32, wherein the cryptographic parameter is the value of the next weighted sum after a predetermined number of iterations.

34. The method of claim 33, wherein the predetermined number of iterations is $\log_2 n$.

35. The method of claim 32, wherein the first weighted sum is the previous weighted sum.

36. The method of claim 32, wherein the corresponding words of the first operand and the second operand are associated with a selected power of a radix.

37. The method of claim 32, wherein the determining of the first weighted sum includes word-shifting at least one of the multiple subproducts.

38. The method of claim 32, wherein the multiple subproducts correspond to low or high branches having no mid-branch ancestors of a corresponding recursion tree.

39. The method of claim 32, wherein the recursively calculated intermediate product corresponds to a mid branch of a corresponding recursion tree.

40. The method of claim 32, wherein at least one of the operands corresponds to a private key, and the cryptographic parameter is a public key.

41. The method of claim 32, wherein the cryptographic parameter is used in digital signature generation or digital signature verification.

42. The method of claim 41, wherein the digital signature generation process or digital signature verification process is part of an elliptic curve digital signature algorithm.

43. An apparatus for performing a cryptographic method, comprising:
means for obtaining a first operand and a second operand having n words, wherein n is an integer that is a power of two and is greater than one;
means for determining a first weighted sum from multiple subproducts, the multiple subproducts being found by multiplying words of the first operand with corresponding words of the second operand;
means for iteratively determining a next weighted sum from a previous weighted sum, a shifted version of the previous weighted sum, and a recursively calculated intermediate product; and
means for outputting a cryptographic parameter.

44. The method of claim 32, wherein the storing comprises padding at least one of the operands to form n words.

* * * * *